US012602891B2

(12) United States Patent
Russell et al.

(10) Patent No.: US 12,602,891 B2
(45) Date of Patent: Apr. 14, 2026

(54) TELEPORTATION SYSTEM COMBINING VIRTUAL REALITY AND AUGMENTED REALITY

(71) Applicant: NVIDIA Corporation, Santa Clara, CA (US)

(72) Inventors: Andrew Russell, Weston, FL (US); Omer Shapira, Brooklyn, NY (US); Max Bickley, Oakland, CA (US); Konstantin Shkurko, Yardley, PA (US); Rev Lebaredian, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 163 days.

(21) Appl. No.: 18/411,327

(22) Filed: Jan. 12, 2024

(65) Prior Publication Data

US 2024/0404226 A1 Dec. 5, 2024

Related U.S. Application Data

(60) Provisional application No. 63/469,781, filed on May 30, 2023.

(51) Int. Cl.
| | |
|---|---|
| *G06T 19/00* | (2011.01) |
| *G06T 7/70* | (2017.01) |
| *G06T 19/20* | (2011.01) |

(52) U.S. Cl.
CPC ............... *G06T 19/20* (2013.01); *G06T 7/70* (2017.01); *G06T 19/006* (2013.01); *G06T 2207/30196* (2013.01); *G06T 2219/024* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2017/0358140 A1* | 12/2017 | Kohler | ............... G02B 27/0172 |
| 2023/0267667 A1* | 8/2023 | Brudy | ....................... G06T 7/70 |
| | | | 345/473 |

OTHER PUBLICATIONS

Oliver Peckham, "ISC Keynote: Digital Twins Aren't About Making Pretty Pictures", https://www.hpcwire.com/2022/06/01/isc-keynote-digital-twins-arent-about-making-pretty-pictures/, HPC Wire, Jun. 1, 2022, 3 pages.

* cited by examiner

*Primary Examiner* — Nicholas R Wilson
(74) *Attorney, Agent, or Firm* — Lowenstein Sandler LLP

(57) ABSTRACT

Apparatuses, systems, and techniques providing a teleportation system combining virtual reality and augment reality are provided. A first set of data associated with a real-world environment is received. An object in the real-world environment, and a first location of the object, are identified based on a subset of the first set of data. A second location of a first user within the real-world environment is identified based on the first set of data. A second set of data representing a first avatar of a guest user is received. A virtual representation of the real-world environment is generated based on the first and second sets of data, comprising the object positioned at the first location and at least one of a second avatar of the first user or the first avatar of the guest user. The virtual representation is send to a computing system associated with the guest user.

19 Claims, 16 Drawing Sheets

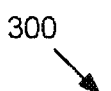

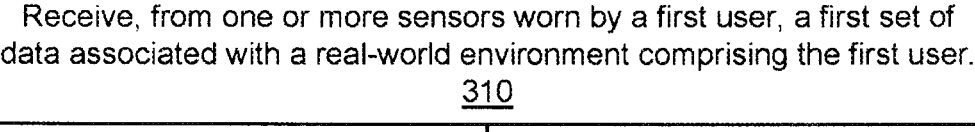

Receive, from one or more sensors worn by a first user, a first set of data associated with a real-world environment comprising the first user. <u>310</u>

Identify, based on the first set of data, an object in the real-world environment and a first location of the object. <u>312</u>

Identify, based on the first set of data, a second location of the first user within the real-world environment. <u>314</u>

Receive a second set of data representing a first avatar of a guest user. <u>316</u>

Generate, based on the first set of data and the second set of data, a virtual representation of the real-world environment comprising the object positioned at the first location and at least one of: a second avatar of the first user positioned at the second location or the first avatar of the guest user positioned at a third location. <u>318</u>

Send the virtual representation to a computing system associated with the guest user. <u>320</u>

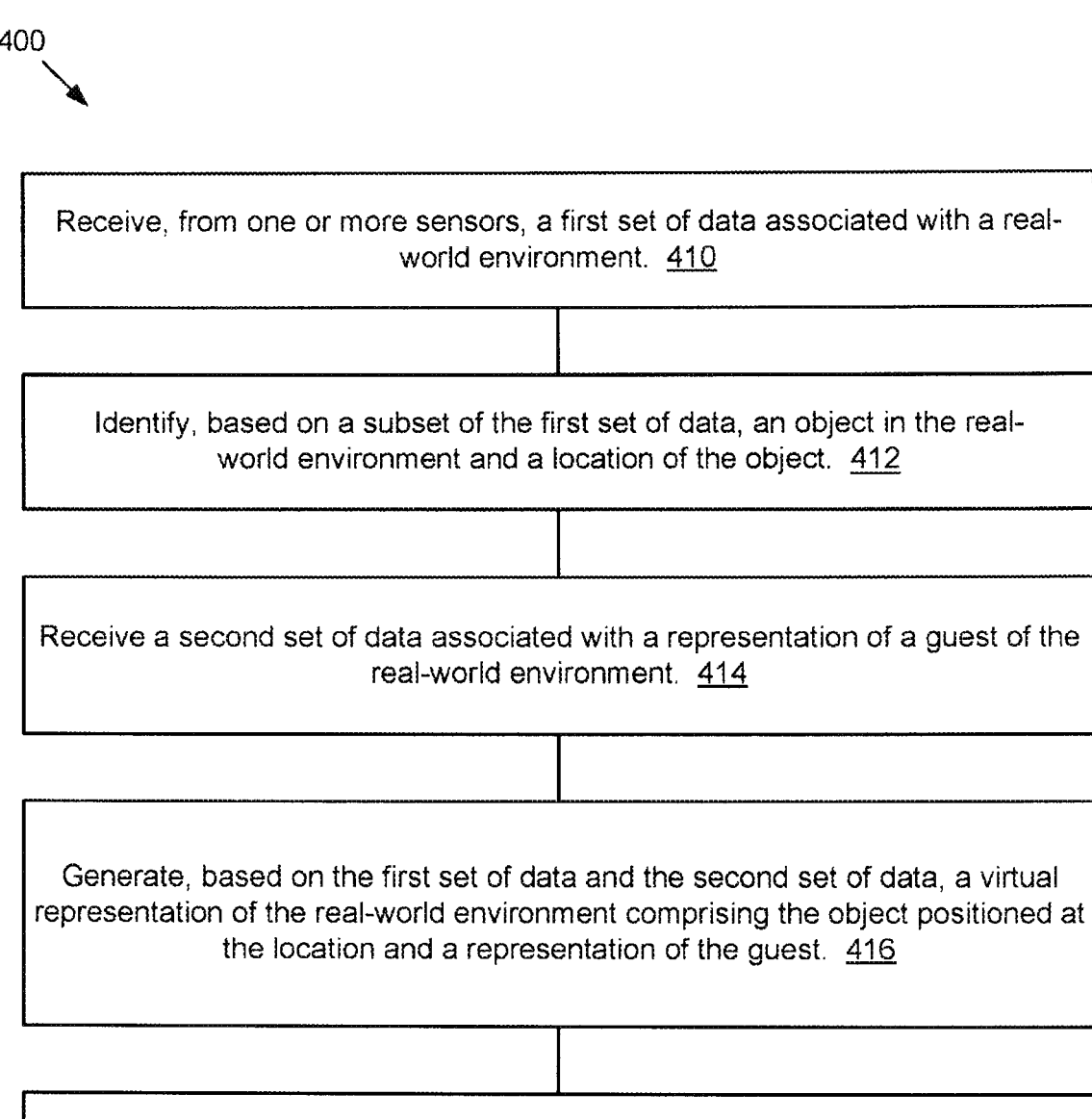

Receive, from one or more sensors, a first set of data associated with a real-world environment. <u>410</u>

Identify, based on a subset of the first set of data, an object in the real-world environment and a location of the object. <u>412</u>

Receive a second set of data associated with a representation of a guest of the real-world environment. <u>414</u>

Generate, based on the first set of data and the second set of data, a virtual representation of the real-world environment comprising the object positioned at the location and a representation of the guest. <u>416</u>

Responsive to a triggering event, send the virtual representation to a computing system associated with the guest. <u>418</u>

FIG. 4

800
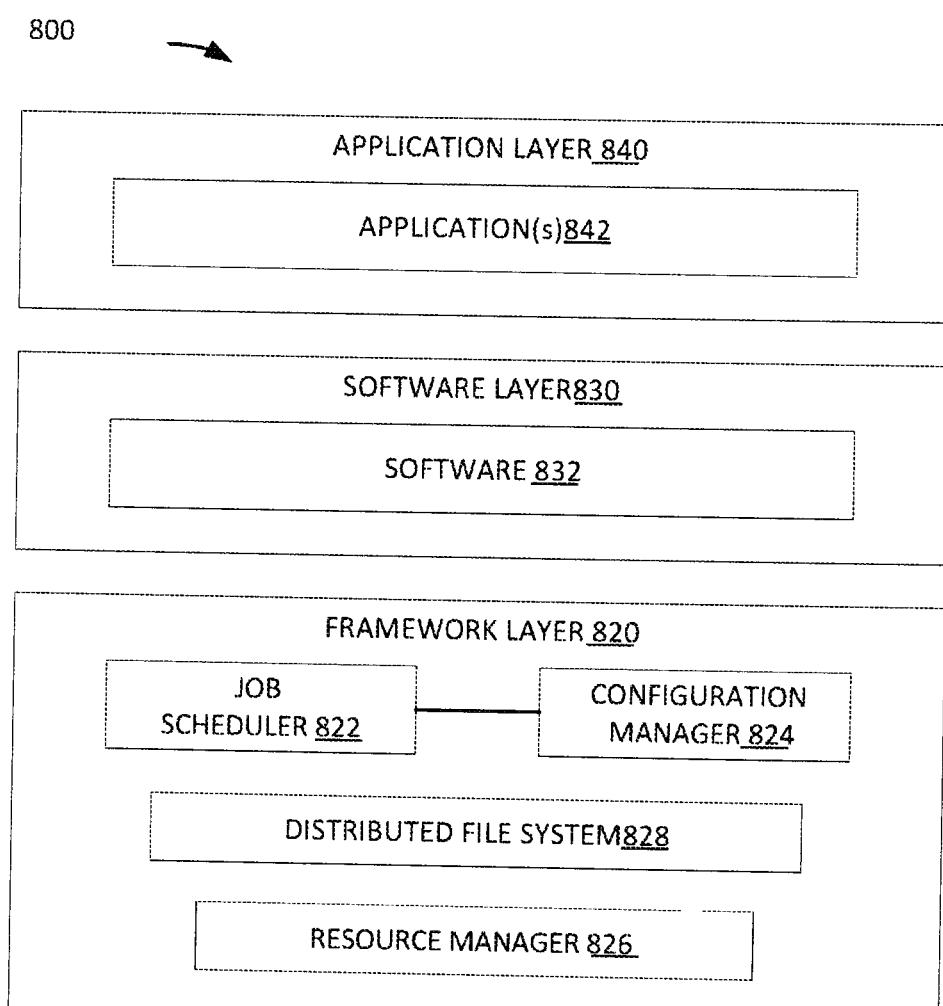
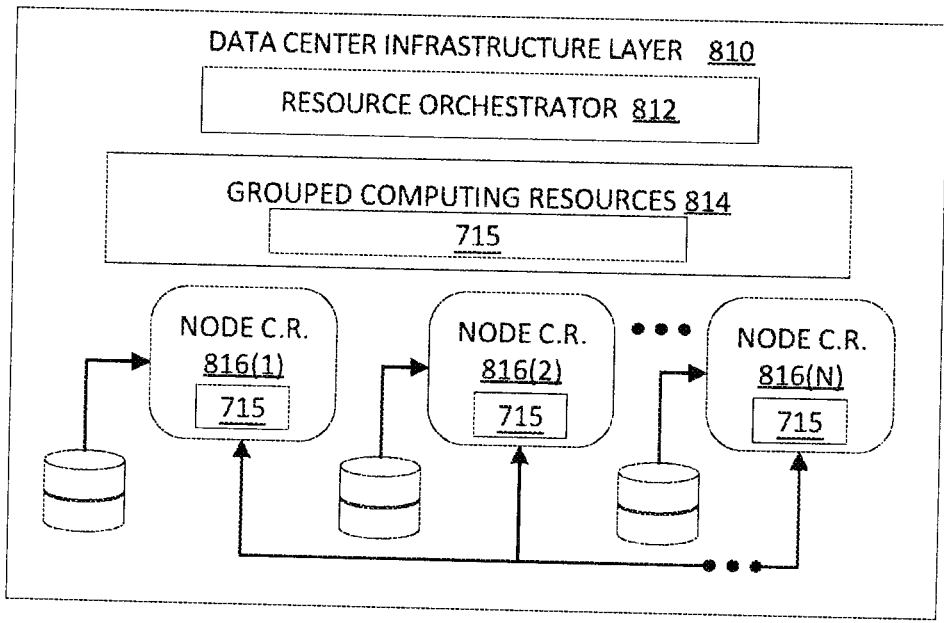
FIG. 8

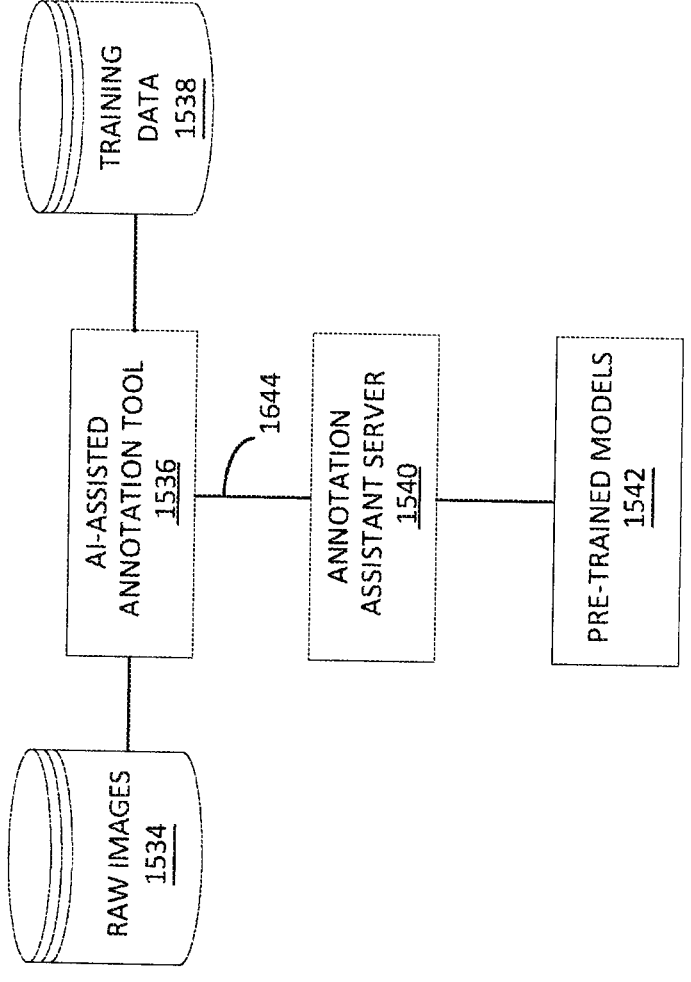
FIG. 15B

TELEPORTATION SYSTEM COMBINING VIRTUAL REALITY AND AUGMENTED REALITY

RELATED APPLICATIONS

This application claims the benefit of U.S. Provisional Application No. 63/469,781, filed May 30, 2023, the entire contents of which is being incorporated herein by reference.

TECHNICAL FIELD

At least one embodiment pertains to system and methods for implementing a teleportation system that combines virtual reality and augmented reality. For example, a user can teleport to a virtual representation of a real-world environment. The virtual representation of the real-world environment can be generated based on data associated with object(s) and/or user(s) in the real-world environment. The virtual representation of the real-world environment can be presented via virtual reality on a graphical user interface on a client device of the user teleporting to the real-world environment, and optionally can be presented (via virtual reality or augmented reality) on a graphical user interface of a client device of a user located in the real-world environment.

BACKGROUND

Virtual reality involves displaying a digital environment that replaces the real-world environment in which a user is located. For example, users can wear a headset that blocks out their physical environment, and can present a virtual world. Augmented reality involves overlaying virtual objects or information onto a real-world environment, e.g., viewable through a lens. Augmented reality systems can use cameras and/or sensors to capture real-world environment data. Virtual elements can be rendered and displayed in real-time, aligned with the real-world environment. Thus, users can see and interact with virtual objects while still being aware of their real-world environment.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 3 is a flow diagram depicting an example method for providing a virtual representation of a real-world environment of a host to a guest computing system, according to at least one embodiment;

FIG. 4 is a flow diagram depicting an example method for providing a virtual representation of a real-world environment to a guest computing system, according to at least one embodiment;

FIG. 8 illustrates an example data center system, according to at least one embodiment;

FIGS. 15A and 15B illustrate a data flow diagram for a process to train a machine learning model, as well as client-server architecture to enhance annotation tools with pre-trained annotation models, in accordance with at least one embodiment.

DETAILED DESCRIPTION OF EMBODIMENTS

Figure 1:
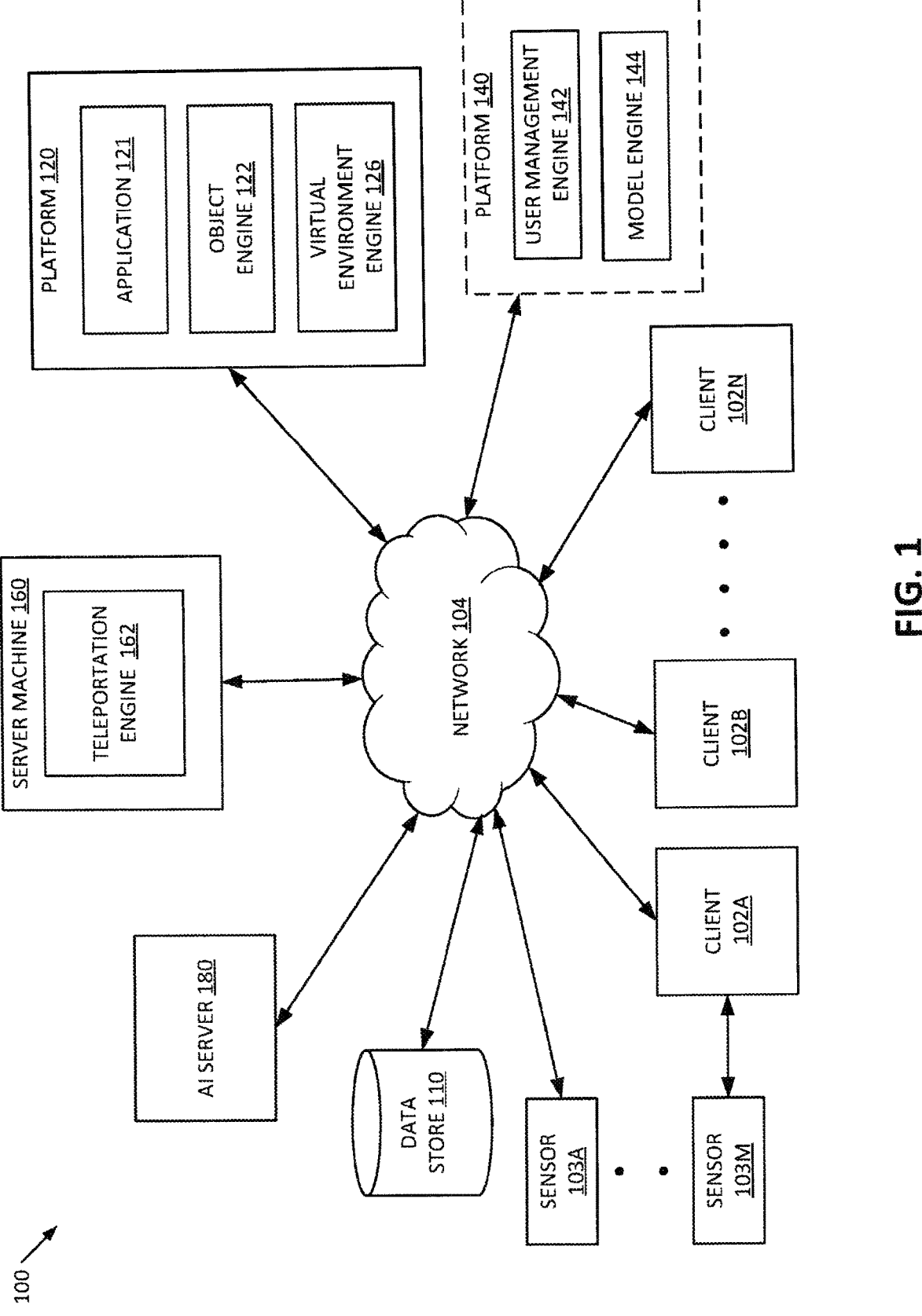
FIG. 1 depicts an illustrative computer system architecture, according to aspects of the present disclosure.

Described herein are technologies directed to methods and mechanisms for a teleportation system that combines virtual reality and augmented reality. An online platform can provide, to users of the platform, a simulation of an environment. The environment can be mimic of a real-world environment, can be a fictitious environment, or a combination. The online platform can provide a virtual representation of the environment to a user via virtual reality or augmented reality. For example, a user can access the simulation of the environment using virtual reality, in which a user wears a headset that blocks out their physical environment. As another example, a user can access the simulation of the environment using augmented reality, in which virtual elements of the environment can be rendered and displayed aligned with the user's real-world environment. However, conventional technology does not enable a user to interact, in real-time, with a simulation of a real-world environment in which the user is not located.

Embodiments of the present disclosure address the above-noted and other deficiencies by proving techniques for enabling a virtual and interactable representation of a real-world environment to be shared between multiple computing systems. In some embodiments, the virtual and interactable representation of a real-world environment can enable users of multiple computing systems to collaborate and share the same space. Embodiments of the present disclosure enable a representation of a user (referred to as a guest user) to be teleported to a real-world environment. In some embodiments, another user (referred to as the host user) can be physically located in the real-world environment. At least one sensor can capture data in the real-world environment. For example, the host can wear a headset that includes at least one sensor. As another example, the host can have one or more sensors attached to their body (e.g., on a piece of clothing). As another example, one or more sensors can be installed in a device held by the host (e.g., a handheld controller). As another example, one or more sensors can be physically located in the real-world environment, such as a part of a camera (e.g., a security camera). The sensor can scan the host user's real-world environment, and generate data representing the real-world environment. The data can be used to create a virtual representation of the real-world environment. For example, the sensor(s) can send the data to a server, which can then use the data to generate a virtual representation of the real-world environment. In some embodiments, the location, actions, and/or movements of a user (e.g., the host user, the guest user, or another user) can also be captured (e.g., by the sensor(s) or by other computing systems in the environment, such as handheld controls, and/or by sensor(s) located in the guest user's or other user's environment), and the location of the user(s) can be incorporated into the virtual representation of the real-world environment.

In some embodiments, to create the virtual representation of the real-world environment, data received from the sensor(s) in the real-world environment can be provided to an artificial intelligence (AI) system that is configured to identify and/or generate virtual representation of objects. In some embodiments, the AI system can include a machine learning (ML) model that is configured to receive scanned data from sensor(s) as input, and provide an identification of an object as output. The identification can correspond to a three-dimensional representation of the object, e.g., stored in a data store. In some embodiments, the AI system can include a generative AI model that can generate a virtual representation of an object from the scanned data. In some embodiments, the AI system can be a combination of the ML model and the AI model.

In some embodiments, an initial virtual representation of the real-world environment can be stored (e.g., in a data store), and the data received from the sensor(s) located in the real-world environment can be used to enhance the initial virtual representation of the real-world environment. The scanned data can be used to identify differences between the real-world environment and the initial virtual representation of the real-world environment. The system can then apply update(s) to the initial virtual representation of the real-world environment to reflect the identified differences.

In some embodiments, a guest user can teleport to the representation of the host's real-world environment. In some embodiments, the guest user can use a virtual reality system to teleport to the host user's real-world environment. The virtual reality system can capture data corresponding to the guest user's actions and/or movements. For example, the virtual reality system can include one or more sensors located in the guest user's environment. In some embodiments, one, some, or all of the sensors can be worn by the guest user (e.g., in immediate contact with the guest user and/or in contact with an article worn by, and/or held by, the guest user, such as a headset, goggles, a game controller, etc.). One, some, or all of the sensors can be placed in the guest user's environment. In some embodiments, the captured data can be sent to the server, which can incorporate the data with the generated virtual representation of the real-world environment. For example, a representation of the guest user (e.g., an avatar representing the guest users) can be added to the virtual representation of the real-world environment. Responsive to the virtual reality system capturing the location, movements and/or actions of the guest user, the representation of the guest user can perform the same (or similar) movements and/or actions in the virtual representation of the real-world environment. In some embodiments, multiple guest users can teleport to the virtual representation of the real-world environment.

In some embodiments, the virtual representation of the real-world environment can be presented to the guest user, e.g., via the virtual reality system. Thus, the guest user can view the representation of the real-world environment, which can include the location, actions and/or movements of the host user. For example, the virtual representation of the real-world environment can include a representation of the host user (e.g., an avatar representing the host user). In some embodiments, the virtual reality representation of the real-world environment viewable by the guest user can also include a representation of the guest user (e.g., can include the location, movements and/or actions of the guest represented by an avatar of the guest user).

In some embodiments, the location, movements, and/or actions of the guest user can be presented to the host user, e.g., via an augmented reality system or a virtual reality system. Using an augmented reality system, the location, movements, and/or actions of the guest user can be presented to the host user as a representation of the guest user, overlaid onto the host user's real-world environment. That is, the host user can view their real-world environment along with a representation of the guest user projected onto their view of their real-world environment. The representation of the guest user can be an avatar of the guest user. The representation of the guest user can move in accordance with the guest user's movements and/or actions.

In some embodiments, the host user can view the virtual reality representation of the real-world environment. In some embodiments, the virtual reality representation of the real-world environment presented to the host user via virtual reality can be the same as the virtual representation that is presented to the guest user. In some embodiments, the virtual reality representation can include representations of both the host user and the guest user.

In some embodiments, a user (either a guest or a host) can interact with the virtual representation of the real-world environment. In some embodiments, a user can interact with objects represented in the virtual representation of the real-world environment. For example, using handheld controls, a user can touch or manipulate a virtual representation of an object. In some embodiments, the user's interactions with the virtual representation of the object can be implemented in the physical real-world environment. For example, the object can be an Internet of Things (IoT) device that is connected to the network. The user can interact with the virtual representation of the IoT device, which can send the user's action(s) to the physical IoT device. As an illustrative example, the object can be a smart thermostat that is connected to the network. The user can interact with the virtual representation of the thermostat, e.g., by turning up the heat. The system can send instructions to the IoT device (e.g., via an API) to turn up the heat according to the user's interactions. Thus, the user's actions can be implemented in both the virtual representation of the real-world environment, and in the physical real-world environment.

In some embodiments, the virtual representation of objects can be updated to reflect a change in state of the objects in the real-world environment. For example, if a user turns on a light, the virtual representation of the light can be updated to reflect that the light is now on. As another example, blinds covering an open window in the real-world environment can move due to a breeze coming through the window, and thus the virtual representation of the blinds in the virtual representation of the environment can change in accordance with the movement(s) of the blinds in the real-world environment. In some embodiments, the system can determine an area of focus of a user, and can place priority on objects within the area of focus. The area of focus can represent the object(s) and/or area to which the user is providing their attention. The system can then prioritize updating the virtual representations of objects within the area of focus over updating the virtual representations of objects that are not within the area of focus. For example, a user's area of focus can be a stove in a kitchen environment, and thus changes to a pot on the stove can be prioritized over changes to the blinds covering a window in the background of the stove. The area of focus can correspond to the host user and/or to the guest user. In some embodiments, the system can prioritize the objects within the host user's area of focus in the virtual representation of the real-world environment presented to the host user, and can prioritize the objects within the guest user's area of focus in the virtual representation of the real-world environment presented to the guest user. That is, the prioritized objects can correspond to each user's area of focus.

In some embodiments, a guest user can be generated using artificial intelligence (AI). For example, the guest user can be an AI generated avatar ("AI guest user"). The AI guest user can be represented in the virtual representation of the real-world environment, and can respond to action(s) performed by one of the other users (e.g., by the host user and/or by another guest user). In some embodiments, the AI guest user can include a large language model that is configured to provide responses to questions and/or actions performed by another user. As illustrative examples, the AI guest user can answer questions posed by another user, can identify items needed to carry out the tasks of the other user(s), can identify ingredients present in the real-world environment and can generate a recipe using the identified ingredients, can generate a recipe in response to one of the user's actions, can help provide instruction corresponding to a recipe, and so forth. The AI guest user in the virtual real-world environment can perform any number of actions corresponding to the virtual representation of the real-world environment.

In some embodiments, the host can be a computing system locating in a real-world environment, in which a user may or may not be present. For example, the real-world environment can be a room, a building, or another environment in which sensor(s) are located. The computing system that acts as the host in the teleportation can be a collection of sensors and/or cameras in the real-world environment. As an illustrative example, real-world environment can be a factory floor, and the computing system acting as the host in the teleportation can be the collection of security cameras and sensors attached to the machinery on the factor floor. The computing system acting as the host can identify and/or generate an interactable virtual representation of the real-world environment, and a guest user (or more) can teleport to the interactable virtual representation of the real-world environment. As an illustrative example, the real-world environment can be a factory that includes robotic arms and multiple sensors (e.g., lidar sensors on the robotic arms, optic sensors on security cameras, and the like). The virtual representation of the real-world environment can be generated and/or updated using data received from the sensors. The virtual representation of the real-world environment can be presented to a guest user via virtual reality, and the guest user can interact with the virtual representation of the real-world environment. In some embodiments, the user's interaction(s) can be implemented in the virtual representation of the real-world environment, and/or in the physical real-world environment (e.g., the user's interaction can correspond to a smart IoT device that is connected to the network, and the system can send an instruction to the IoT device via an API to perform an action that corresponds to the user's interact). In some embodiments, the virtual representation of the real-world environment can represent a recording of a prior event that took place in the real-world environment, and a guest user can teleport to the virtual representation and interact with objects in the virtual representation. Thus, a user can interact with an event that has already occurred, allowing the user to travel back in time and virtually experience the event. In some embodiments, a guest user can teleport to a virtual representation of a real-world environment in response to receiving a notification. For example, the alarm can sound in the real-world environment, and the guest user can view the virtual representation of the real-world environment in response to the alarm. As another example, a host user in the real-world environment can request that a guest user teleport to the virtual representation of the real-world environment, and the guest user can view the virtual representation of the real-world environment in response to receiving the request from the host user.

Aspects and embodiments of the present disclosure provide users of a platform with access to virtual representations of objects in a real-world environment, and enable users to interact with the objects in the virtual representation of the real-world environment. By using data received from sensors in the physical real-world environment, aspects and embodiments of the present disclosure can update an existing virtual representation of an object in a real-world environment, for example via APIs of smart IoT devices, and/or by prioritizing objects within a user's area of focus. Providing a virtual representation using these and other features described throughout can improve the overall efficiency and reduce latency of the system(s) providing the virtual representations. That is, by applying modifications to existing virtual representations, and optionally by limiting the modifications to a user's area of focus, systems implementing the features described herein can utilize fewer computing resources when providing virtual representations of real-world environments, and thus improve the overall efficiency of the system. Additionally, aspects and embodiments of the present disclosure can use existing virtual representations of real-world environments (e.g., stored in a data store or accessible via a network, such as the Internet) to supplement the virtual representation of a user's real-world environment, thus efficiently providing an accurate representation of a user's real-world environment consuming fewer computing resources (e.g., processing cycles, etc.). Such resources are available for other processes of the system, which can increase efficiency and decrease latency of the overall system.

The systems and methods described herein may be used for a variety of purposes, by way of example and without limitation, these purposes may include systems or applications for online multiplayer gaming, machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray tracing, path tracing, etc.), collaborative content creation for 3D assets, digital twin systems, cloud computing and/or any other suitable applications.

Disclosed embodiments may be comprised in a variety of different systems such as systems for participating on online gaming, automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

FIG. 1 is a block diagram of an example system architecture 100, according to at least one embodiment. The system architecture 100 (also referred to as "system" herein) includes client devices 102A-N, sensors 103A-M, a data store 110, a platform 120, a server machine 160, and/or an artificial intelligence (AI) server 180, each connected to a network 104. In additional or alternative embodiments, system 100 can optionally include a platform 140 that is connected to client devices 102A-N, sensors 103A-M, data store 110, platform 120, server machine 160, and/or AI server 180 using network 104. In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 104.

The client devices 102A-N (collectively and individually referred to as client device(s) 102 herein) refers to any device (or software that executes using a device) that requests access to data and/or a service provided by a computing service (e.g., platform 120). In some embodiments, client devices 102A-N may also be referred to as "user devices." In some embodiments, client device(s) 102 may include computing devices such as personal computers (PCs), laptops, mobile phones, smart phones, tablet computers, netbook computers, network-connected televisions, etc. In other or similar embodiments, client device(s) 102A-N can include or be connected to a virtual reality (VR) device (e.g., a VR headset) that is configured to provide a VR experience to a user of platform 120 and/or platform 140. The VR device can be a monolithic VR device (e.g., a VR headset that includes a dedicated processor and/or power source) or another type of VR device, in some embodiments. In other or similar embodiments, client device(s) 102A-N can include or be connected to an augmented reality (AR) device (e.g., an AR headset) that is configured to be a monolithic AR device (e.g., an AR headset that includes a dedicated processor and/or power source) or another type of AR device, in some embodiments. In some embodiments, a client device 102 can include or connected to a device that is capable of executing both VR and AR systems. In such embodiments, a user of client device 102 can switch between VR and AR.

Each client device 102A-N may include a content viewer. In some implementations, a content viewer may be an application that provides a user interface (UI) for users to view and/or upload content, such as images, video items, web pages, documents, etc. The content viewer can enable a user of client device 102A-N to view a rendered representation of a real-world environment in AR and/or VR. In some embodiments, the content viewer may be a web browser that can access, retrieve, present, and/or navigate content (e.g., web pages such as Hyper Text Markup Language (HTML) page, digital media items, etc.) served by a web server. The content viewer may render, display, and/or present the content to a user. The content viewer may also include an embedded media player (e.g., a Flash® player or an HTML5 player) that is embedded in a web page (e.g., a web page that may provide information about a product sold by an online merchant). In some embodiments, the content viewer may be a standalone application (e.g., a mobile application or app) that allows users to view digital media items (e.g., digital video items, digital images, electronic books, etc.).

The sensors 103A-M refer to any device that can generate and transmit data to another device via a network (e.g., network 104). In some embodiments, at least one sensor 103A-M can be an Internet of Things (IoT) device that can transmit and receive data via network 104. An IoT device can be a device that has one or more sensors, processing ability, and software that can connect to, and exchange data with, other IoT devices and/or to a server device (e.g., other sensors 103A-N, client devices 102A-N, data store 110 server machine 160, platform 120, and/or platform 140) over a network (e.g., network 104). In some embodiments, at least one sensor 103A-N can be a smart device that can collect and transmit data via network 104. A smart device refers to a context-aware device that is capable of performing autonomous computing and connecting to other devices (e.g., other sensors 103A-N, client devices 102A-N, data store 110 server machine 160, platform 120, and/or platform 140) via network 104. In some embodiments, sensors 103A-M can provide an additional understanding of the real-world environment, such as geometric orientation and transformations of instances of objects. Sensor 103A-M can run an application programming interface (API) to send and receive data. In at least one embodiment, a sensor 103M can be connected directly to a client device 102A. Examples of sensors 103A-M include a light detection and ranging (lidar) sensor, an optical sensor, a camera (e.g., an RBG camera, a monochrome camera), infrared sensor, or any other type of sensor device that can collect data representing the environment in which they are located.

In some embodiments, client device 102A-N can be, can include, and/or can be connected to one or multiple cameras and/or sensors 103A-M. The cameras and/or sensors 103A-M can be used to scan the real-world environment in which the client device 102A-N is located. Scanning the real-world environment can include collecting data that describes the real-world environment, such as capturing images of the real-world environment. In some embodiments, the scan data can provide a semantic understanding of the scene. Client devices 102A-N and/or sensors 103A-M can send the scan data (e.g., the captured images of the real-world environment) to platform 120, platform 140, and/or server machine 160 via network 104.

In some embodiments, platform 120 can provide users with access to renderings of one or more real-world objects, and/or renderings of a virtual representation of a real-world environment that includes virtual representations of one or more real-world objects. In some embodiments, platform 120 can be or correspond to an object detection platform or other similar type platform. In some embodiments, platform 120 can collect data from client devices 102A-N and/or sensors 103A-M. As illustrated in FIG. 1, platform 120 can include an object engine 122, and/or a virtual environment engine 126, in some embodiments. In additional or alternative embodiments, object engine 122, and/or virtual environment engine 126 can reside at one or more server machines (e.g., server machine 160, AI server 180, another server machine not shown, etc.). In such embodiments, platform 120 can access object engine 122, and/or virtual environment engine 126 using network 104.

Platform 120 can include an object engine 122 that can identify, generate, and/or modify virtual objects using the data received from client device 102A-N and/or sensors 103A-M. The virtual objects can represent objects in the real-world environment. The real-world environment can be an environment in which at least one client device 102A-N or sensor 103A-M is physically located. Platform 120 can include a virtual environment engine 126 that can generate a virtual representation of the real-world environment, which can include at least one virtual object from object engine 122.

Object engine 122 can be configured to identify image data and/or characteristic data associated with an object in a real-world environment. Object engine 122 can receive the scan data (e.g., the captured images of a real-world environment corresponding to a client device 102A-N and/or sensors 103A-M). Object engine 122 can analyze the scan data to identify distinct visual features in the environment, such as corners, edges, textures, patterns, etc. In some embodiments, object engine 122 can utilize AI server 180 to analyze the scan data. In some embodiments, object engine 122 can generate a virtual representation of an real-world object based on scan data, image data, and/or characteristic data associated with a real-world environment of at least one of the client devices 102A-N and/or sensor 103A-M, as described herein. In other or similar embodiments, virtual environment engine 126 may obtain a previously generated virtual representation of a real-world environment (e.g., from data store 110). The virtual environment engine 126 can update or otherwise modify the previously generated virtual representation of a real-world environment, e.g., based on scan data received from client 102A-N and/or sensor 103A-M. In some embodiments, the object engine 122 can track the movements of the identified objects, e.g., by comparing an object's movement across subsequent image frames. In some embodiments, the object engine 122 can compare the scan data to a library of virtual representations of real-world objects (e.g., stored in data store 110) to identify a representation of the real-world object.

In some embodiments, image data and/or characteristic data associated with the object in the real-world environment can be provided to a neural radiance field (NeRF) engine that is configured to generate a model file to render the object as a 3D object. The NeRF engine can generate the model file for the 3D object based on 2D images, in some embodiments. In some embodiments, the NeRF engine can include, correspond to, or implement techniques of Neural Graphics Primitives (NGP) Instant NeRF™ by NVIDIA Corporation. In some embodiments, the model files can be additionally or further updated to include instructions associated with modifications to the real-world object according to the identified movements of the identified objects, in accordance with embodiments described herein.

In some embodiments, each model file associated with generating a rendering the real-world object and/or real-world environment can have a distinct rendering format. As provided above, a rendering format of a model file represents or otherwise defines data organization and compression techniques that are to be applied by a rendering engine to data and/or instructions of a model file to generate the rendering of a 3D object. In some instances, client devices and/or applications (or application instances) executing using the client devices can be configured to execute model files having particular rendering formats (e.g., according to a type of hardware components of the client devices, etc.). Each model file associated with generating the rendering of the real-world object and/or real-world environment that is updated by the platform can have a distinct rendering format. Accordingly, the model files updated by the platform can be executed by rendering engines associated with client devices and/or applications that support different types of model file rendering formats. Examples of model file rendering formats include, but are not limited to a graphics library transmission format binary file format (e.g., GLB format), a Filmbox (FBX) format, a geometry definition file format (e.g., OBJ format), a universal scene description-based format (e.g., USD format, USDZ format, etc.), a standard tessellation language (STL), a standard for the exchange of product data (STEP) format, a collaborative design activity (COLLADA) format, and any other such formats for model files.

In some embodiments, virtual environment engine 126 can be configured to generate a virtual representation of a real-world environment that includes the object(s) identified and/or generated by object engine 122. In some embodiments, virtual environment engine 126 can generate the virtual representation of a real-world environment based on scan data, image data, and/or characteristic data associated with a real-world environment of at least one of the client devices 102A-N and/or sensor 103A-M, as described herein. In other or similar embodiments, virtual environment engine 126 may obtain a previously generated virtual representation of a real-world environment (e.g., from data store 110). The virtual environment engine 126 can update or otherwise modify the previously generated virtual representation of a real-world environment, e.g., based on scan data received from client 102A-N and/or sensor 103A-M. In some embodiments, platform 120 can provide a rendering of the virtual representation of the real-world environment to a user associated with a client device 102A-N, in accordance with embodiments of the present disclosure.

Platform 140 can provide users with access to renderings of one or more virtual avatars (sometimes referred to as avatars herein), in some embodiments. In some embodiments, platform 140 can be or can otherwise correspond to a 3D graphics collaboration platform, such the Omniverse™ Platform by NVIDIA Corporation. A virtual avatar can refer to a virtual character or representation associated with a user. The user can control the virtual avatar (e.g., using an associated client device 102) and/or can interact with virtual avatars associated with other users using the application. In some embodiments, the virtual avatar associated with the user can be generated based on image data (e.g., photos, video data, etc.) provided to platform 140 (e.g., by the user) and can depict one or more characteristics of the user. In other or similar embodiments, the virtual avatar can depict one or more characteristics of a character selected by the user. It should be noted that embodiments of the present disclosure apply to any type of virtual avatar and/or any type of 3D object. In some embodiments, the avatar representing a user of client device 102A-N can be randomly generated, e.g., by the platform 140. In other embodiments, the avatar can represent a generative artificial intelligence model that is designed to interact with user(s) of client device(s) 102A-N. For example, platform 140 can generate an AI avatar that does not represent a user of client devices 102A-N, and that can interact with at least one user of client devices 102A-N. Platform 140 can utilize AI server 180 to generate, implement, and/or modify avatars.

Platform 140 can include a user management engine 142 and/or a model engine 144, in some embodiments. In additional or alternative embodiments, user management engine 142 and/or model engine 144 can reside at one or more server machines (e.g., server machine 160, AI server 180, another server machine not shown, etc.). In such embodiments, platform 140 can access user management engine 142 and/or model engine 144 using network 104. User management engine 142 can be configured to manage data associated with one or more users of platform 140. In some embodiments, user management engine 142 can obtain data associated with a virtual avatar associated with the user (e.g., from client device 102) and can store the obtained data at data store 110. The obtained data can include image data associated with the user, one or more avatar characteristics associated with the virtual avatar (e.g., clothing style, hair style, hair color, accessories), and so forth. Model engine 144 can be configured to generate a model file that, when rendered, depicts a virtual avatar associated with a user. Model engine 144 can generate the model file based on the obtained user data, in some embodiments. In other or similar embodiments, model engine 144 may obtain a model file (e.g., from user management engine 142, from another engine or component of system 100, etc.) and can update or otherwise modify the model file prior to rendering of the virtual avatar.

Teleportation engine 162 can render display data and/or image data from real-world data (including object data) for transmission to and/or presentation by client device(s) 102A-N. In some embodiments, teleportation engine 162 can include a rendering engine that corresponds to correspond to RTX Renderer™ from NVIDIA Corporation. Teleportation engine 162 can leverage any number of processing units (e.g., graphical processing units (GPUs)) and/or nodes thereof for rendering the display data and/or image data from the object data. In some embodiments, teleportation engine 162 can execute ray tracing (e.g., real time ray tracing) and/or path tracing using one or more GPUs to generate photo-realistic renderings of objects associated with object data. Object data can include data used by teleportation engine 162 to render a 3D object (e.g., a real-world objects, a virtual avatar, etc.).

In some embodiments, the object data can indicate a bone structure associated with the 3D object, an indication of a mesh (e.g., a polygon mesh) for the 3D object, and/or an indication of one or more blend shapes (also referred to as morph targets) for the 3D object. The bone structure can include one or more bones that are each indicated by a bone index. The mesh can include one or more polygons made up of vertices, edges, and faces. Each blend shape can represent a distinct representation of at least a portion of the 3D object. The object data can, in some embodiments, include an indication of a motion vector for each vertex of at least a portion of the mesh. A motion vector can indicate a degree and/or a direction of a motion of a respective vertex in accordance with the 3D object. In an illustrative example, a motion vector can include at least three values each indicating a degree of movement of the vertex according to a respective axis of motion (e.g., an x-axis, a y-axis, a z-axis, etc.). A positive value can indicate movement in a positive direction along the axis, while a negative value can indicate movement in a negative direction along the axis. In some embodiments, the object data can be included in a model file, such as a model file generated or otherwise obtained by virtual environment engine 126 and/or model engine 144, as described above.

In some embodiments, teleportation engine 162 can be associated with platform 120. In such embodiments, platform 120 can generate first object data associated with a real-world object based on the scan data, image data and/or the characteristic data associated with the real-world object, as described above. Platform 120 can also obtain (e.g., from data store 110, from platform 140, etc.) second object data associated with a virtual avatar, e.g., of a user of platform 120 and/or platform 140. Platform 120 can provide the first object data and the second object data to teleportation engine 162. Teleportation engine 162 can generate a rendering of a virtual representation of a real-world environment based on the first object data and the second object data. Platform 120 and/or platform 140 can provide the virtual representation of the real-world environment to a client device 102 for presentation to a user, in accordance with embodiments described herein. In other or similar embodiments, teleportation engine 162 can reside at a client device 102. In such embodiments, platform 120 and/or platform 140 can provide the first object data and the second object data to client device 102 (e.g., using network 104). Teleportation engine 162 at the client device 102 can generate the rendering of a virtual representation of a real-world environment based on the first object data and the second object data. The client device 102 can provide the rendering to a user using a UI of client device 102.

In some embodiments, the level of fidelity of the virtual representation of the real-world environment can depend on the compute power of the device operating the teleportation engine 162. That is, the accuracy of the virtual representation of the real-world environment can depend on which device is performing the instructions that correspond to the teleportation engine 162. For example, if the teleportation engine 162 is being implemented by a local client device 102 that has limited computing resources, the fidelity of the virtual representation of the real-world environment can be limited to a threshold fidelity power, to avoid overwhelming the computing resources of the client device 102. Thus, the virtual representation of the real-world environment can be successfully provided by the client device 102. Conversely, if the teleportation engine 162 is being implemented by a device that has a large amount of available computing resources (e.g., a server device, or a local client device that is not limited to a relatively small amount of computing resources), the fidelity of the virtual representation of the real-world environment can be increased. In some embodiments, the teleportation engine 162 can determine the amount of computing resources available on the device, and can adjust the fidelity of the virtual representation of the real-world environment accordingly. As an illustrative example, the teleportation engine 162 can compare the available computing resources to one or more threshold values. Each threshold value can be associated with a fidelity level. If the available computing resources below or above a threshold value, the teleportation engine 162 can adjust the fidelity of the virtual representation of the real-world environment according to the fidelity level of the corresponding threshold value.

In some embodiments, teleportation engine 162 can enable a user of a client device 102A-N to teleport to an environment of another client device 102A-N and/or sensor 103A-M. For example, teleportation engine 162 can generate, e.g., using platform 140, a virtual representation of the real-world environment in which client device 102A is located. Teleportation engine 162 can obtain, e.g., from platform 120, a virtual representation of a user associated with client device 102A, a virtual representation of a user associated with another client device, e.g., client device 102B, and/or an AI generated avatar (e.g., an AI guest user). The virtual representation of the user associated with client devices 102A-B can be a virtual avatar. The teleportation engine 162 can provide a rendering of the virtual representation of the real-world environment in which client device 102A is located, along with the virtual representations of the user of client device 102A, of client device 102B, and/or the AI generated avatar, to client device 102B. Client device 102B can include a VR application that can present the virtual representation of the real-world environment in which client device 102A in located, including the virtual representation(s) of the user(s) of client devices 102A,B, and/or the AI generated avatar (e.g., an AI guest user). Thus, the user of client device 102B can, using virtual reality, be view and interact with the virtual representation of the real-world environment in which client device 102A is located, which can include virtual representation(s) of the user(s) of client devices 102A,B, and/or the AI generated avatar.

In some embodiments, client device 102A can include an augmented reality application. Using the augmented reality application, teleportation engine 162 can cause the virtual representation of the user of client device 102B to be overlaid onto the real-world environment of client device 102A. Thus, the user of client device 102A can view and interact with the virtual representation of the user of client device 102B. In some embodiments, the teleportation engine 162 can provide the same (or similar) virtual representation of the real-world environment to client device 102A, e.g., either via virtual reality or augmented reality. For example, client device 102A can include an application that can present the virtual representation of the real-world environment, including the virtual representation of the user of client device 102A, the virtual representation of the user of client device 102B, and/or the AI generated avatar, using either VR or AR. The user of client device 102A can switch between viewing the virtual representation of the real-world environment in AR and VR. In some embodiments, the VR representation of the real-world environment can be the same as the virtual representation of the real-world environment that is presented to client device 102B, while the AR representation of the real-world environment can omit some or all the virtual representations of objects in the real-world environment and include the virtual representation of the user of client device 102B and/or the AI generated avatar. The teleportation engine 162 can update the virtual representation of the real-world environment based on interactions of the user(s), as further described herein.

In some embodiments, platform 120 can provide users (e.g., of client devices 102A-N) with access to one or more applications 121. In some embodiments, users of platform 120 can access the features and functionalities of application 121 via an application instance running using a client device 102. An application instance refers to a collection or grouping of resources used to execute features and functionalities of application 121 via client device 102. In an illustrative example, an application instance can include a portion or segment of instructions (e.g., code) associated with application 121 that is executed by computing resources of client device 102 to provide a user with access to the features or functionalities of application 121. Multiple client devices 102 can execute the instructions to provide respective users with access to the application 121 (e.g., simultaneously). Each instance of application 121 provided via a client device 102 can be isolated from other application instances provided via other client devices, in some embodiments.

In some embodiments, application 121 can enable the users to access, create, modify, etc., a virtual scene or a virtual environment. A virtual scene or virtual environment, as described herein, refers to a simulated or digital representation of a configuration of virtual assets (e.g., characters, objects, design elements, etc.). In some embodiments, platform 120 can be or can otherwise correspond to a 3D graphs collaboration platform, such as the Omniverse™ Platform by NVIDIA Corporation. Application 121 can, in some embodiments, provide users with access to tools or resources that enable the users to create or modify a virtual scene. In some embodiments, the tools or resources can include virtual asset design or development tools, graphics rendering resources, and so forth. A user can access the tools or resources via an instance of application 121 running via a respective client device 102 to create and/or modify virtual assets in the virtual scene. In some embodiments, a virtual scene or virtual environment can include a virtual representation of the real-world environment in which the corresponding client device 102 (e.g., the client device 102 that is running the instance of application 121) is located. In some embodiments, application 121 can provide the virtual scene or virtual environment to the user using augmented reality and/or virtual reality. In some embodiments, application 121 can enable a user to switch between viewing the virtual environment in augmented reality and virtual reality. In some embodiments, the virtual scene or virtual environment can include a virtual representation of a real-world environment in which the corresponding client device 102 is not located, thus enabling the user of the corresponding client device 102 to teleport to the real-world environment. In some embodiments, the user of the corresponding client device 102 can engage with tools or resource of application 121 to add/remove virtual objects from the virtual scene, modify an appearance of a virtual object of the virtual scene, modify an appearance of an avatar in the virtual scene, and so forth.

In some embodiments, platform 120 can maintain or otherwise have access to a virtual asset data store that includes one or more virtual objects and/or virtual environment. The virtual object and/or virtual environment data store can reside at data store 110 and/or any region of memory of or connected to system 100, in some embodiments. In some embodiments, a virtual object included in the virtual object data store can be associated with one or more object identifiers that can indicate characteristics (e.g., positioning, orientation, configuration, scale, etc.) of the virtual object. In some embodiments, a virtual environment in the virtual environment data store can be associated with one or more environment identifiers that can indicate characteristics (e.g., indoors/outdoors, size, type, etc.) of the virtual environment. In some embodiments, the virtual object and/ or virtual environment data store can store data associated with a virtual objects and/or environments (e.g., a model file for rendering the virtual object or environment), one or more identifiers, and/or a mapping between the one or more identifiers and the data associated with the virtual object or environment.

In some embodiments, the virtual representation of the real-world environment can be stored in data store 110. The stored virtual representation of the real-world environment can be a recording of the real-world environment, spanning a time period (e.g., a few seconds, a few hours, or longer). Teleportation engine 162 can enable a user of client device 102A-N to view and enter the stored virtual representation of the real-world environment. That is, a virtual representation of a user of client device 102A-N can be added in the stored virtual representation of the real-world environment, and the virtual representation of the user of client device 102A-N can view and interact with the stored virtual representation of the real-world environment.

As illustrated in FIG. 1, system 100 can include an AI server 180. In some embodiments, AI server 180 can include a generative model that can generate data in response to or otherwise associated with a request from a user of client device 102. AI server 180 is further described with respect to FIGS. 5-6.

It should be noted that although some embodiments of this disclosure provide that platform 120 is a distinct platform from platform 140, in additional or alternative embodiments, platform 120 and platform 140 can be or can otherwise correspond to the same platform. For example, components of platform 120 (e.g., object engine 122, virtual environment engine 126, etc.) can reside at or can be otherwise accessible to platform 140. In another example, components of platform 140 (e.g., user management engine 142, model engine 144, etc.) can reside at or can be otherwise accessible to platform 120. In other or similar embodiments, one or more components of platform 120 and/or platform 140 can reside at or can otherwise be accessible to other platforms not shown in FIG. 1, in accordance with embodiments of the present disclosure.

It should be noted that although FIG. 1 illustrates object engine 122 and virtual environment engine 126 as part of platform 120, in additional or alternative embodiments, object engine 122, and/or virtual environment engine 126 can reside on one or more server machines that are remote from platform 120. It should also be noted that although FIG. 1 illustrates user management engine 142 and model engine 144 as part of platform 140, in additional or alternative embodiments, user management engine 142 and/or model engine 144 can reside on one or more server machines that are remote from platform 140. It should be noted that in some other implementations, the functions of platform 120, platform 140, server machine 160 and/or AI server 180 can be provided by more or a fewer number of machines. For example, in some implementations, components and/or modules of platform 120, platform 140, server machine 160 and/or AI server 180 may be integrated into a single machine, while in other implementations components and/or modules of any of platform 120, platform 140, server machine 160 and/or AI server 180 may be integrated into multiple machines. In addition, in some implementations, components and/or modules of server machine 160 and/or AI server 180 may be integrated into platform 120 and/or platform 140.

In general, functions described in implementations as being performed platform 120, platform 140, server machine

160 and/or AI server 180 can also be performed on the client devices 102A-N in other implementations. In addition, the functionality attributed to a particular component can be performed by different or multiple components operating together. Platform 120 and/or platform 140 can also be accessed as a service provided to other systems or devices through appropriate application programming interfaces, and thus is not limited to use in websites.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
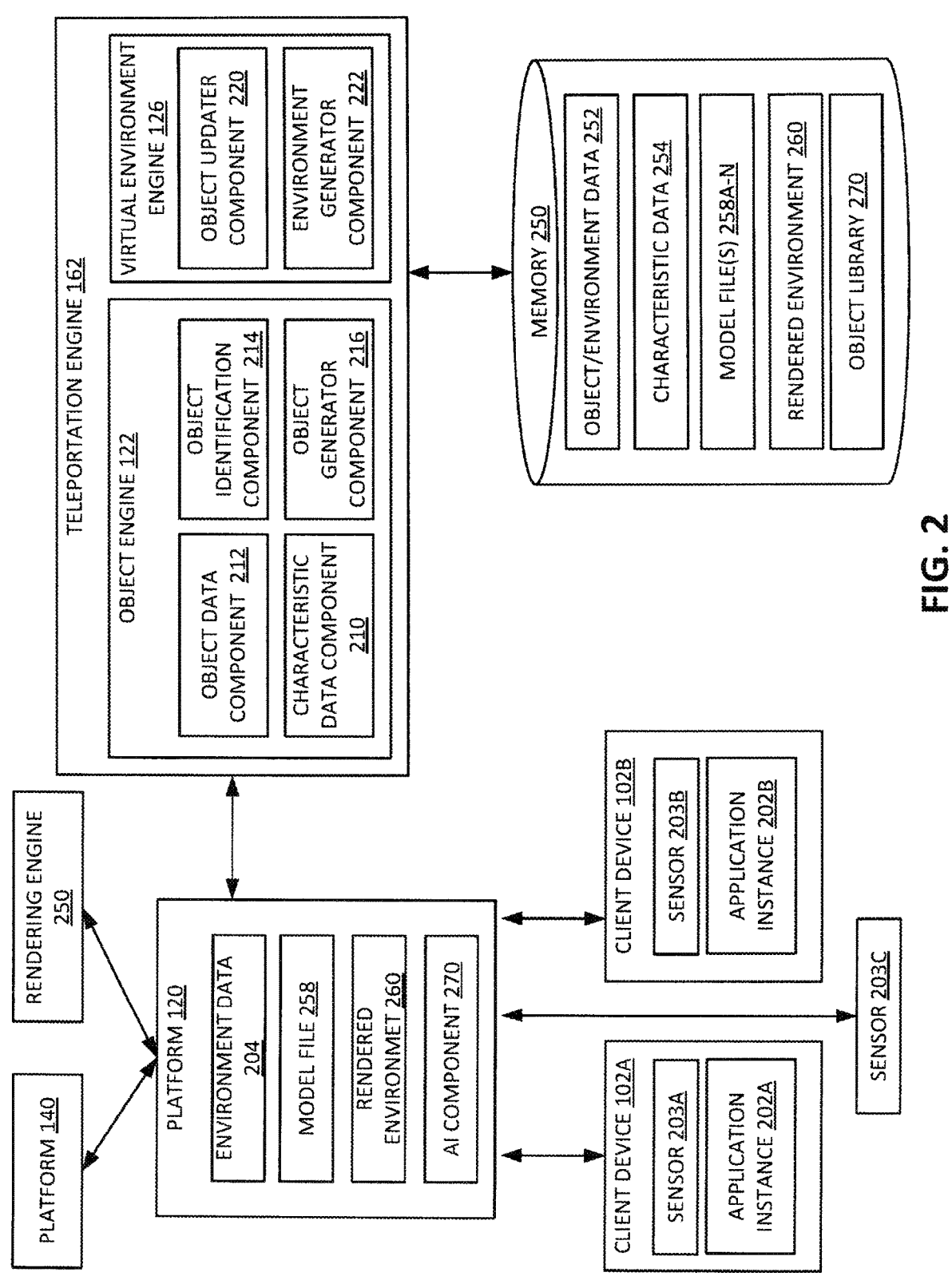
FIG. 2 is a block diagram that includes an example platform and an example teleportation engine, according to at least one embodiment.

FIG. 2 is a block diagram that includes an example platform 120 and an example teleportation engine 162, according to aspects of the present disclosure. In some embodiments, teleportation engine 162 can reside at or can otherwise be connected to platform 120 (e.g., using network 104). In other or similar embodiments, teleportation engine 162 can reside at or can otherwise be connected to platform 140 (e.g., using network 104). In some embodiments, platform 120 and/or teleportation engine 162 can be connected to memory 250. Memory 250 can correspond to one or more portions of data store 110, in some embodiments. In additional or alternative embodiments, memory 250 can correspond to any memory of, connected to, or accessible by a component of system 100. It should be noted that while FIG. 2 illustrates two client devices 102A,B and one standalone sensor 203C, any number of client devices 102A,B and any number of sensor 203A,C can be included in the system illustrated in FIG. 2.

In some embodiments, teleportation engine 162 can include an object engine 122 and a virtual environment engine 126. In some embodiments, object engine 122 can include object data component 212, characteristic data component 210, object identification component 214, and/or object generator component 216. In some embodiments, virtual environment engine 126 can include object updater component 220 and/or environment generator component 222.

Platform 120 can provide users with access to a rendering of a virtual representation of a real-world environment, which can include one or more virtual representations of real-world objects. In some embodiments, users can view and/or interact with the virtual representation of the real-world environment, e.g., through application instance 202A,B on client device 102A,B (respectively). In some embodiments, application instance 202A,B, can provide the virtual representation of the real-world environment to users using augmented reality and/or virtual reality, as described above. In some embodiments, platform 140 can generate and/or provide an avatar to represent a user (e.g., of client device 102A,B) in the virtual representation of the real-world environment. In some embodiments, platform 140 can generate and/or provide an AI-generated avatar in the virtual representation of the real-world environment.

Platform 120 can include environment data 204, model file 258, and/or rendered environment 260. In some embodiments, client device 102A,B can scan its environment (e.g., using a camera and/or sensor), and can collect environment data 204. That is, environment data 204 can be data received from client devices 102A,B and/or sensor 203C. Environment data 204 be data that represents a real-world environment, and/or a user of a client device 102A,B. Model file 258 can represent a virtual representation of a real-world environment, and can be rendered into rendered environment 260 (e.g., by rendering engine 255). In some embodiments, model file 258 can be provided by virtual environment engine 126. Rendered environment 260 can be the virtual representation of the real-world environment, e.g., as generated and/or provided by environment generator component 222. Platform 120 can provide rendered environment 260 to client devices 102A,B. In some embodiments, platform 120 can provide model file 258 to client devices 102A,B, and the client devices 102A,B can render the model file to provide the virtual representation of the real-world environment to a user of the client device 102A,B. In some embodiments, application instance 202A,B can provide the rendered environment 260 to the corresponding client device 102A,B. Application instance 202A,B can enable a user of the corresponding client device 102A,B to view and interact with the rendered environment 260. Application instances 202A,B can provide the rendered environment in virtual reality, and/or augmented reality.

Client device 102A, 102B, and/or sensor 203C, can provide environment data 204 to platform 120. Environment data 204 can be data that represents a real-world environment. In some embodiments, client device 102A,B (e.g., using a sensor 203A,B) and/or sensor 203C can scan the environment in which it is located, and can collect data representing the environment. In some embodiments, client device 102A,B can collect data representing a real-world environment from sensors to which it is connected (e.g., via a network), such as security cameras, IoT devices that include a sensor, smart devices that are connected to the same network, and the like. Client device 102A,B and/or sensor 203C can then provide the scanned and/or otherwise collected data representing the real-world environment to platform 120. In some embodiments, the scanned data can include 2-dimensional images of the environment. In some embodiments, the scanned data can include data points that correspond to objects in the real-world environment.

Object engine 122 can identify objects within the real-world environment. In some embodiments, object data component 212 can extract a subset of environment data 204 that corresponds to a real-world object in the real-world environment. In some embodiments, object data component 212 can use a machine learning (ML) model that is trained to identify a subset of data that corresponds to an object. For example, the ML model can take as input a set of data that represents a real-world environment, and can output a subset of the data that corresponds to an object in the real-world environment. In some embodiments, the subset of data can be stored in object/environment data 252. Object identification component 214 can use the subset of data to identify a virtual representation of the identified object in the real-world environment. In some embodiments, object identification component 214 can provide the environment data (or a subset thereof) to a machine learning model that is trained to identify a virtual representation of an object. In some embodiments, the ML model can provide an object identifier. The object identifier can correspond to an object in the object library 270. That is, the object library 270 can store multiple virtual representations of objects. Each object can correspond to an object identifier. The ML model can identify the object identifier that most closely matches the object in the environment data 204 (or the subset thereof). In some embodiments, the object engine 122 can use the virtual representation of the object in object library 270 that corresponds to the object identifier.

In some embodiments, characteristic data component 210 can identify differences between the object in the environment data 204 and the object stored in object library 270 that corresponds to the identified object identifier. The identified differences can be stored in characteristic data 254. Examples of differences can include a different color, a difference in the positioning or orientation of the object, a difference in scale, etc. As an illustrative example, the object identification component 214 can identify a pair of scissors stored in object library 270 that most closely matches the object represented in the subset of data, and characteristic data component 210 can determine that the virtual representation of the pair of scissors stored the object library 270 illustrates the scissors in a closed position, while the subset of the environment data 204 corresponding to the scissors illustrates the scissors in an open position. The characteristic data component 210 can provide instructions to modify the virtual representation of the object stored in object library 270 to apply the identified modifications to the virtual representation of the object (e.g., to modify the virtual representation of the scissors from a closed position to an open position). The object generator component 216 can then apply the instructions received from the characteristic data component 210 to the virtual representation stored in object library 270 to generate a virtual representation of the object in the real-world environment.

In some embodiments, the object generator component 216 can generate a virtual representation of the object without first identifying a matching object in object library 270. For example, the object identification component 214 may not have identified a matching object in object library 270. As another example, object engine 122 may not have access to an object library 270. Object generator component 216 may include (or otherwise have access to) a generative artificial intelligence (AI) system that is configured to generate a virtual representation of an object using the identified subset of environment data 204 corresponding to the object (e.g., as identified by object data component 212).

In some embodiments, virtual environment engine 126 can generate a virtual representation of the real-world environment. In some embodiments, virtual environment engine 126 can send the virtual representation of the real-world environment to platform 120 and/or to client devices 102A, B. In some embodiments, virtual environment engine 126 can include an environment generator component 222 and an object updater component 220. Environment generator component 222 can generate a model file 258A-N that corresponds to the virtual representation of the real-world environment. In some embodiments, environment generator component 222 can assemble the virtual representations of the objects from object engine 122, and can generate a virtual representation of the real-world environment that includes the virtual representations of the objects. In some embodiments, environment generator component 222 can include the virtual avatars from platform 140, as described above. In some embodiments, environment generator component 222 can identify a model file (e.g., in model files 258A-N) that is similar to the real-world environment. In some embodiments, the environment generator component 222 can identify similarities (and/or dissimilarities) between the real-world environment represented by environment data 204 and the model files 258A-N, and can identify a model file 258A-N that most closely matches the real-world environment data 204 based on the number of similarities (and/or dissimilarities) satisfying a criterion (e.g., the number of similarities exceeds a similarity threshold value, and optionally the number of dissimilarities is less than a dissimilarity threshold value). In some embodiments, the environment generator component 222 can use an ML model trained to identify a model file 258A-N that is similar to the environment data 204. The environment generator component 222 can identify differences between the model file 258A-N and the real-world environment data 204. The environment generator component 222 can generate instructions to apply identified differences to the model file 258A-N to generate the virtual representation of the real-world environment.

In some embodiments, the environment generator component 222 can generate a virtual representation of the real-world environment without first identifying a similar model file 258A-N. For example, the environment generator component 222 may not have identified a model file 258A-N that satisfies the similarity criterion. As another example, virtual environment engine 126 may not have access to model files 258A-N. Environment generator component 222 may include (or otherwise have access to) a generative artificial intelligence (AI) system that is configured to generate a virtual representation of a real-world environment that includes the virtual representations of objects from object engine 122.

In some embodiments, virtual environment engine 126 can generate a model file 258A-N that corresponds to the environment data 204 (i.e., the represents the virtual representation of the real-world environment). Virtual environment engine 126 can transmit the model file to platform 120. In some embodiments, virtual environment engine 126 can generate a rendered environment 260 (e.g., using rendering engine 255), and can store the rendered environment 260 in memory 250. In some embodiments, virtual environment engine 126 can transmit the rendered environment 260 to platform 120. In some embodiments, rendered environment 260, environment data 204, model file 258, and/or object/environment data 252 can be deleted or otherwise erased from memory 250 (and/or other memory associated with system 100) upon receiving an indication that the user(s) have finished using them. For example, application instance 202A,B can receive an indication that the user(s) have finished their teleportation session (e.g., a user can close application instance 202A,B, or can log out of the session). In such a case, application instance 202A,B can cause the virtual representation of the real-world environment, the virtual representation of the object, the environment data 204, the rendered environment 260, the object/environment data 252, the model file(s) 258A-N, and any other data collected, generated and/or stored corresponding to the users' teleportation session to be deleted, removed, and otherwise erased.

In some embodiments, object updater component 220 can generate and/or provide instructions to update a virtual representation of an object in the virtual representation of the real-world environment. Client devices 102A,B, and/or sensor 203C can provide updated scans of the real-world environment. The updated scans can be transmitted on a predetermined schedule (e.g., every second), and/or in response to a triggering event (e.g., in response to detecting movement in the real-world environment). In some embodiments, client devices 102A,B and/or sensor 203C can provide continuous streams of scanned data of the real-world environment. In some embodiments, the updated scan data can be stored in object/environment data 252.

In some embodiments, object updater component 220 can identify a user's area of focus. The area of focus can be a subset of the environment with which the user is engaging or otherwise providing focus. Engagement can include interacting with an object in the environment (either a real object in the real-world environment, or a virtual representation of an object in the virtual representation of the real-world environment). Interacting with an object can include picking it up, moving, looking at it, etc. In some embodiments, object updater component 220 can track a user's eye movements to determine the area of focus. Object updater component 220 can prioritizing updating virtual representations of objects that are within the user's area of focus before updating virtual representations of objects that are not within the user's area of focus. For example, updates to a virtual representation of an object with which a user is interacting (e.g., touching, moving, etc.) can take priority over updates to a virtual representation of an object that a user is looking at.

In some embodiments, based on scan data received from client device 102A,B, and/or sensor 203C, object updater component 220 can identify a user's interaction with a virtual representation of an object in the rendered environment 260. Object updater component 220 can generate instructions to modify the model file 258 and/or the rendered environment 260 according to the user's interaction with the virtual representation of the object.

In some embodiments, object updater component 220 can update a state of a physical object in the real-world environment. The physical object can be a smart device or an IoT device. The object updater component 220 can transmit instructions, via the API of the device, to perform an operation corresponding to the identified interaction of a user with the virtual representation of the object. As an illustrative example, the object can be a smart light switch that is connected to the network via a network (e.g., network 104). The object updater component 220 can identify, based on scan data received from sensor 203C and/or client device 102A,B, that a user has pressed on the virtual representation of the smart light switch. Pressing on the smart light switch changes the state of the corresponding light, e.g., either from on to off, or from off to on. Thus, the object updater component 220 can generate and send instructions to the smart light switch, via the API, to change the state of the light in the real-world environment.

In some embodiments, application instance 202A,B can provide audio corresponding to the rendered environment. The audio can be a continuous stream that is collected from the client device 102A,B sensor 203C, and/or another sound capturing device (e.g., a microphone) in the real-world environment. In some embodiments, application instance 202A,B, and/or teleportation engine 162 can add audio to the rendered environment. For example, if a user's interaction with a virtual representation of an object in the real-world environment has a corresponding audio component, the teleportation engine 162 can provide the corresponding audio component to the platform 120. As an illustrative example, a user can interact with a virtual representation of a smart garage door opener in the real-world environment. The user's interaction can result in the garage door moving from an open position to a closed position. The teleportation engine 162 can identify a sound component corresponding to the movement of the garage door, and add the audio component to virtual representation of the real-world environment.

In some embodiments, platform 140 can provide an AI-generated avatar (e.g., via model 144). Virtual environment engine 126 can include the AI-generated avatar in the virtual representation of the real-world environment (e.g., in rendered environment 260). The AI-generated avatar can monitor a user's interaction with the virtual representation of the real-world environment, and can interact with the virtual representation of the real-world environment using generative AI. As an illustrative example, the AI-generated avatar can generate a recipe based on the ingredients that a user is using while cooking a meal. More specifically, the AI-generated avatar can identify the ingredients that the user is using, can identify the amount of each ingredient, how the user is combining the ingredients, how the user is cooking the combined ingredients, etc., and based on this collected data, can generate a recipe of the meal for the user.

In some embodiments, the virtual environment engine 126 can incorporate generative AI into the virtual representation of the real-world environment without including an AI-generated avatar. In some embodiments, AI component 275 can be used to incorporate a generative AI into the virtual representation of the real-world environment. That is, generative AI can be respond to text entered by a user, speech detected by a user, and/or by monitoring the scan data received from client device 102A,B and/or sensor 203C. For example, application instance 202A,B can enable a user to ask a question, either orally or by entering test, to generative AI in correlation to the virtual representation of the real-world environment. In some embodiments, the generative AI can tailor the answer to the virtual representation of the real-world environment. For example, the real-world environment can include a user fixing the engine of a car, and the user can ask the generative AI what type of part is needed to replace a specific part of the engine. The generative AI component can tailor the answer to the question to the specific make and model of the car, rather than provide a more generic answer, even if the user did not specify the make and model of the car in their question. That is, the generative AI component 275 can take into consideration the object/environment data 252 corresponding to the virtual representation of the real-world environment when generating an answer to the question. As another example, the generative AI component can tailor the answer to the question based on the location of the real-world environment and/or the user teleporting to the real-world environment. For example, a user can request a list of stores that sell the part needed to fix the engine. Rather than provide a list of stores nationwide, the generative AI component can list stores within a certain radius of the user, even if the user did not specify a location for the list of stores.

In some embodiments, the generative AI component can provide additional information in the virtual representation of the real-word environment. The additional information may not have been requested by a user. That is, the generative AI component can determine that a user is almost out of eggs (e.g., by determining that there is only one egg left in the carton that is located on the countertop in the real-world environment), and the generative AI component can provide a list of local stores, store hours, sales, coupons, and/or other information that the user may find useful related to buying eggs. The generative AI component 275 may be part of platform 140, platform 120, AI server 180 (of FIG. 1), teleportation engine 162, and/or client device 102A,B.

FIG. 3 is a flow diagram depicting an example method 300 for providing a virtual representation of a real-world environment of a host to a guest computing system, according to aspects of the present disclosure. FIG. 4 is a flow diagram depicting an example method 400 for providing a virtual representation of a real-world environment to a guest computing system, according to aspects of the present disclosure. In some embodiments, method 300 and/or method 400 can be performed by platform 120 and/or one or more components of or connected to platform 120. For example, one or more operations of method 300 and/or method 400 can be performed by teleportation engine 162, in some embodiments. Method 300 and/or method 400 can be performed by one or more processing units (e.g., CPUs and/or GPUs), which can include (or communicate with) one or more memory devices. In at least one embodiment, method 300 and/or method 400 can be performed by multiple processing threads (e.g., CPU threads and/or GPU threads), each thread executing one or more individual functions, routines, subroutines, or operations of the method. In at least one embodiment, processing threads implementing method 300 and/or method 400 can be synchronized (e.g., using semaphores, critical sections, and/or other thread synchronization mechanisms). Alternatively, processing threads implement method 300 and/or method 400 can be executed asynchronously with respect to each other. Various operations of method 300 and/or method 400 can be performed in a different order compared with the order shown in FIG. 3 and/or FIG. 4, respectively. Some operations of the methods can be performed concurrently with other operations. In at least one embodiment, one or more operations shown in FIG. 3 and/or FIG. 4 may not always be performed. Method 300 may be performed by processing logic that may include hardware (circuitry, dedicated logic, etc.), software (e.g., instructions run on a processing device), or a combination thereof. In one implementation, some or all the operations of method 300 and/or method 400 may be performed by one or more components of system 100 of FIG. 1.

Referring now to FIG. 3, at block 310, processing logic receives, from one or more sensors worn by, or disposed on, a first user (e.g., a host user), a first set of data associated with a real-world environment comprising the first user. The real-world environment can represent a room (e.g., a classroom, a kitchen, a garage, or any kind of room), multiple rooms, a building (e.g., a house, a school, a factory, or any other kind of building), and/or an outdoor environment (e.g., a backyard, a playground, a park, or any other kind of outdoor environment) in which the first user (e.g., the host user) is located. The method can be applied to any real-world environment. The one or more sensors can be any type of sensor that can capture image data of the environment in which the sensor is located. In some embodiments, one of, some of, or all of the one or more sensors can be worn by the first user such that the sensor(s) are in immediate contact with the first user (e.g., in contact with the skin and/or clothes of the first user). In some embodiments, one of, some of, or all of the one or more sensors can be worn by the first user in such a way that the sensor(s) are not in immediate contact with the first user, but rather are in contact with an item worn by the first user. For example, a sensor worn by a first user can be installed in (or otherwise attached to) an article or item worn by the first user, such as a headset, a hat, glasses, goggles, gloves, shoes, etc. In some embodiments, a sensor worn by a first user can include a sensor attached to an item that is being held by the first user, such as a remote control or game controller.

The first set of data can be image data that represents the environment in which the sensor is located. The image data can include, for example, specific features or patterns in the environment. In some embodiments, a sensor can be worn by a person who is present in the real-world environment. For example, a sensors can be worn in a headset. As another example, a sensor can be on a piece of clothing of a person present in the real-world environment. In some embodiments, a sensor can be located in the real-world environment, such as security cameras, cameras installed in a computer (e.g., a webcam), or any other type of device that includes a sensor that is connected to the network (e.g., network 104 of FIG. 1).

At block 312, processing logic identifies, based on the first set of data, an object in the real-world environment and a first location of the object. In some embodiments, the processing logic identifies the object in the real-world environment based on a subset of the first set of data. The first location of the object can include a position, an orientation, a configuration, and/or a scale of the object. The first location of the object can be based on metadata associated with the first set of data. For example, the processing logic can track the movements of objects identified in the real-world environment based on the first set of data to identify a position and/or orientation of an object in the real-world environment.

In some embodiments, processing logic can create a 3D object based on the first set of data. In some embodiments, processing logic can create the 3D object based on an output of a neural radiance field (NeRF) engine, as described above. For example, processing logic can provide the subset of the first set of data as input to a NeRF engine that generates data (e.g., of a model file) for the 3D object based on the given input data. as indicated above, the NeRF engine can include, correspond to, or implements techniques of NGP Instant NeRF™ by NVIDIA Corporation. In some embodiments, processing logic can generate a virtual 3D representation of the object using generative AI, as described herein.

In some embodiments, processing logic can detect the object in the real-world environment, based on the first set of data. For example, the detected object can be a two dimensional image representation of the object. In response to detecting the object, processing logic can perform a semantic search for the object. The search can be based on the detected image of the object (e.g., the raw pixel data) and/or an image mask of the detected image. An image mask can be, for example, a binary or grayscale image where certain parts are designated to either allow or block manipulation or identification of the underlying image. For example, a binary mask may use only black and white, where the image can be identified based on the white areas.

In some embodiments, processing logic can identify a virtual object candidate corresponding to the object in the real-world environment. To identify the virtual object candidate, processing logic can generate a vector embedding of the object. In some embodiments, a vector embedding may be produced, for example, by a neural network implementing a mathematical transformation on symbols (e.g., raw pixel data of an image of the object) using embedding functions to map such symbols into their numerical representations (e.g., a vector). Each vector embedding can have a certain length (e.g., a predetermined length). Processing logic can then search an embedding space for one or more virtual object candidates within a threshold distance to the vector embedding in the embedding space. An embedding space refers to a multi-dimensional space in which data points are represented as vectors (or vector embeddings). Processing logic can select the virtual object candidate from the one or more virtual object candidates. For example, one or more virtual object candidates can be ranked based on how closely they resemble the object in the real-world environment, and the selected virtual object candidate can the highest ranked virtual object candidate. As another example, the selected virtual object candidate can be the virtual object candidate that has a corresponding similarity metric that satisfies a threshold value. In some embodiments, the processing logic can transform the two-dimensional selected virtual object candidate into a three-dimensional virtual representation of the object using at least a subset of the first set of data. That is, the first set of data (optionally including metadata) can include details of the pose, position, orientation, configuration, and/or scale of the object in real-world environment, and the processing logic can use these details to transform the selected virtual object candidate into a three-dimensional virtual object candidate. The object positioned at the first location in the virtual representation of the real-world environment includes the virtual objects candidate positioned at the first location.

In some embodiments, processing logic can determine that the object has moved to a fourth location in the real-world environment. For example, processing logic can receive an updated set of data, which may indicate that the object has moved. Processing logic can perform an update set and match the moved object with the previously inserted virtual candidate object. In some embodiments, processing logic can identify an updated virtual candidate object corresponding to the moved object in the real-world environment. To identify an updated virtual candidate object, the processing logic can generate a second vector embedding of the object. Processing logic can then search the embedding space for one or more updated virtual object candidates within a threshold distance to the second vector embedding in the embedding space. Processing logic can then select the updated virtual object candidate from the one or more updated virtual object candidates, e.g., based on a ranking of the updated virtual object candidates and/or based on a similarity metric score (as described above). Processing logic can then match the updated virtual candidate to the virtual object candidate in the virtual representation of the real-world environment, and ca update the virtual object candidate to the updated virtual object candidate.

At block 314, processing logic identifies, based on the first set of data, a second location of a first user (e.g., a host user) within the real-world environment. For example, the processing logic can track the movements of objects identified in the real-world environment based on the first set of data to identify a position and/or orientation of a first user in the real-world environment.

At block 316, processing logic receives a second set of data representing a first avatar a guest user. In some embodiments, the guest user can be user of a client device. In other embodiments, the guest user can be an artificial intelligence generated avatar. In some embodiments, the second set of data can include data generated by one or more sensors that are associated with the guest user. One of, some of, or all of the sensors associated with the guest user can be worn by, or disposed on, the guest user such that the sensor(s) are in immediate contact with the guest user (e.g., in contact with the skin and/or clothes of the guest user). In some embodiments, one of, some of, or all of the sensors can be worn by the guest user in such a way that the sensor(s) are not in immediate contact with the guest user, but rather are in contact with an item worn by the guest user. For example, a sensor worn by a guest user can be installed in (or otherwise attached to) an article or item worn by the guest user, such as a headset, a hat, glasses, goggles, gloves, shoes, etc. In some embodiments, a sensor worn by a guest user can include a sensor attached to an item that is being held by the guest user, such as a remote control or game controller. In some embodiments, the sensor(s) associated with the guest user can be located in the environment in which the guest user is located. The second set of data can include data representing the guest user, including the location of the guest user.

At block 318, processing logic generates, based on the first set of the data and the second set of data, a virtual representation of the real-world environment comprising the object positioned at the first location, and a second avatar of the first user positioned at the second location and/or the first avatar of the guest user positioned at a third location. In some embodiments, generating the virtual representation of the real-world environment can include dynamically updating the virtual representation to coincide with changes in the real-world environment. The processing logic can determine changes made in the real-world environment, such as an object moving, the state of an object changing (e.g., a light turning on or off, or a light changing color), or lighting changes in the real-world environment as day turns to night, to list a few examples. Processing logic can identify additional changes in the real-world environment not listed here. Processing logic can dynamically update the virtual representation of the real-world environment to reflect the identified changes in the real-world environment, in near real time, as further described herein.

In some embodiments, the virtual representation of the real-world environment can include a virtual representation of the object positions at the first location. The virtual representation of the object can be based on an existing virtual representation in a data store. In some embodiments, processing logic identifies a virtual data store that stores virtual representations of objects. Processing logic can identify, based on the subset of the first set of data, in the virtual data store, one of the virtual representations of objects as the virtual representation of the object in the real-world environment. Processing logic can include the identified virtual representation of the object in the virtual representation of the real-world environment. In some embodiments, the existing virtual representation of the object in the data store may differ from the object in the real-world environment. Processing logic can identify the existing virtual representation of the object as satisfying a similarity criterion. In some embodiments, the virtual representation of the object satisfies a similarity criterion. For example, the number of differences between the existing virtual representation in the data store can have less than a threshold number of differences from the object in the real-world environment, and/or more than a threshold number of similarities. Processing logic can identify the differences between the existing virtual representation in the data store and the object in the real-world environment. Processing logic can include one or more indications that represent the identified differences. The virtual representation of the object can be the identified existing virtual representation in the data store as well as the indication(s) of the differences. In some embodiments, the virtual representation of the real-world environment includes the virtual representation of the object and an indication of one or more modifications to the virtual representation of the object. The one or more modification correspond to the first subset of data.

In some embodiments, the virtual representation of the object can be generated by a model (e.g., a machine learning model, or a generative model). In some embodiments, processing logic provides at least a subset of the first set of data as input to a model that is configured to generate three-dimensional representation data of objects. Processing logic receives, as output from the model, three-dimensional representation data of the object in the real-world environment. Processing logic generates, based on the output of the model, a virtual representation of the object. Processing logic can include the virtual representation of the object in the virtual representation of the real-world environment.

In some embodiments, the virtual representation of the real-world environment can be generated by a model (e.g., a machine learning model, or a generative model). In some embodiments, processing logic provides the first set of data as input to a model that is configured to generate three-dimensional representational data of real-world environments. Processing logic receives, as output from the model, three-dimensional representational data of the real-world environment. Processing logic generates, based on the output of the model, the virtual representation of the real-world environment. The generated virtual representation of the real-world environment is three-dimensional.

In some embodiments, processing receives, from the computing system, an additional set of data associated with the virtual representation of the object in the virtual representation of the real-world environment. Processing logic causes, based on the additional set of data, the virtual representation of the real-world environment to be updated. For example, the guest user can interact with the virtual representation of the object in the virtual representation of the real-world environment. As an illustrative example, the guest user can virtually turn on a light in the virtual representation of the real-world environment. The computing system can receive data corresponding to a state change in the object (e.g., the light changing from off to on), and can cause the virtual representation of the real-world environment to be updated (e.g., by turning on the light). In some embodiments, the computing system can cause the object to be updated in the virtual representation of the real-world environment, and/or in the real-world environment (e.g., by causing the physical light to turn on). In such an illustrative example, the light switch is an IoT device connected to the network. In some embodiments, processing logic sends, via an application programming interface (API), the additional set of data associated with the virtual representation of the object. The API causes an action to be executed with respect to the object in the real-world environment.

At block 320, processing logic sends the virtual presentation to a computing system associated with the guest user. The computing system associated with the guest can include a virtual reality system. In some embodiments, the processing logic can cause the virtual representation of the real-world environment to be presented in a virtual reality application of a client device. In other embodiments, the processing logic can cause the virtual representation of the real-world environment to be presented in an augmented reality application of a client device. In yet other embodiments, the processing logic can cause the virtual representation of the real-world environment to be presented in a mixed reality application of a client device.

In some embodiments, processing logic sends, to another computing system associated with the first user (e.g., the host user), the virtual representation and/or an indication indicating that the virtual representation is being sent to the computing system associated with the guest user. The other computing system associated with the first user, and/or the computing system associated with the guest user, can include a virtual reality system and/or an augmented reality system.

In some embodiments, processing logic receives a third set of data from one or more devices in the real-world environment. In some embodiments, the devices can include Internet of Things (IoT) devices, such as a smart devices. Examples of IoT devices that can send data include a light switch, a garage door opener, a thermostat, an appliance (e.g., an oven, a refrigerator, a washing machine, a dryer, a dishwasher, a toaster, etc.), a television, a radio, a speaker, a security camera, a robot vacuum, a nanny-cam, a body-cam, and other similar devices. An IoT device can include devices with sensors, processing ability, software and other technologies that connect and exchange data with other devices and systems over the Internet or other communications networks. Thus, IoT devices can send metadata indicating a status of the device. For example, an IoT light switch can send data (in some cases, metadata) indicating whether the light is turned on. As another example, security cameras installed in the real-world environment, and/or robots moving throughout the real-world environment can provide additional understanding of the scene in the real-world environment, such as geometric orientation and transformations of the objects (e.g., a light is turned on, a garage door is opened or closed, etc.).

In some embodiments, processing logic receives a fourth set of data associated with the real-world environment. The fourth set of data can be based on existing data, such as from a digital twin or a 3D representation of an environment. In some embodiments, the fourth set of data can supplement the first set of data associated with the real-world environment. For example, the first set of data can represent one or two key points in the real-world environment, and the fourth set of data can be received from an existing set of data that adds detail to the key points in the real-world environment. As an illustrative example, the first set of data can correspond to a conveyor belt in a factory, and the fourth set of data can be received from a digital twin of the factory. The fourth set of data in this illustrative example can provide the details of the real-world environment surrounding the conveyor belt, such as the other machine(s) in the factor, the placement of the windows, the light fixtures, the doors, and/or any other feature that exists in the real-world environment. As another example, the real-world environment can be outdoors, and the first set of data can correspond to a small area that is directly in front of the first user (e.g., a parked car, a tree, or a play structure). In this illustrative example, the fourth set of data can be identified within an existing 3D representation of the outdoor environment, and can be used to supplement the first set of data by providing additional detail (e.g., the street surrounding the parked car, park benches, buildings in the distance, etc.). Processing logic can update the virtual representation of the real-world environment based on the third set of data and/or the fourth set of data.

In some embodiments, processing logic identifies an area of focus of the real-world environment. The area of focus can be associated with the first user. In some embodiments, processing logic can track the user's eye movements to identify the area of focus. In some embodiments, processing logic can identify the area of focus based on the user's interactions with the real-world environment (e.g., the user can pick up an object in the real-world environment, and thus the processing logic can identify the area surrounding the object as the area of focus). The area of focus can be an area surrounding the object (or the determined eye direction) by a predetermined radius, for example. Processing logic assigns a priority to one or more objects located within the area of focus. In response to receive updated data corresponding to a first object of the one or more objects located within the area of focus, processing logic causes the first object to be updated prior to other objects in the real-world environment.

In some embodiments, processing logic identifies an area of focus associated with the guest of the real-world environment. Similar to determining the area of focus for the first user, processing logic can determine the area of focus for the guest based on eye movements of the guest of the real-world environment (e.g., if the user is wearing a VR headset). In some embodiments, processing logic can determine the area of focus for the guest based on the guest's interaction(s) or engagement with the virtual representation of the real-world environment. For example, if the guest engages with a virtual representation of an object in the virtual representation of the real-world environment, processing logic can assign a higher priority to the virtual representation of the object, and optionally to the surrounding area (e.g., based on a predetermined radius) in the virtual representation of the real-world environment.

Referring now to FIG. 4, at block 410, processing logic receives, from one or more sensors, a first set of data associated with a real-world environment. Block 410 can be similar to block 310 described above. At block 412, processing logic identifies, based on a subset of the first set of data, an object in the real-world environment and a location of the object. Block 412 can be similar to block 312 described above. At block 414, processing logic receives a second set of data associated with a representation of a guest of the real-world environment. Block 414 can be similar to block 316 described above.

At block 416, processing logic generates, based on the first set of data and the second set of data, a virtual representation of the real-world environment comprising the object positioned at the location and a representation of the guest. Block 416 can be similar to block 318 described above.

At block 418, responsive to a triggering event, processing logic sends the virtual representation to a computing system associated with the guest. In some embodiments, the triggering event can be a notification generated by a first computing system that is associated with the real-world environment. For example, the first computing system can be physically located in the real-world environment.

In some embodiments, processing logic can receive, from the computing system, a third set of data associated with a virtual representation of the object in the virtual representation of the real-world environment. Processing logic can cause the virtual representation of the real-world environment to be updated based on the received third set of data. For example, the third set of data can represent an interaction of the guest with the virtual representation of the object. The interaction can be a change in the location, state, positioning, or orientation of the object, for example. Processing logic can then update the virtual representation of the real-world environment to reflect the interaction with the virtual representation of the object.

In some embodiments, processing logic can send the third set of data associated with the virtual representation of the object via an application programming interface (API), which can cause an action to be executed with respect to the object in the real-world environment. for example, the object can be a smart IoT device connected to the network. Processing logic can send the data representing guest's interaction with the smart IoT device via an API, which can then perform an action with respect to the smart IoT device. AS an illustrative example, the smart IoT device can be a light switch, and the guest's interaction can be to flip the light switch (e.g., either turn on or turn off the light connected to the light switch). Processing logic can send the data representing this action to the smart light switch, and the smart IoT device can perform the action (in this example, by flipping the light switch).

Figure 5:
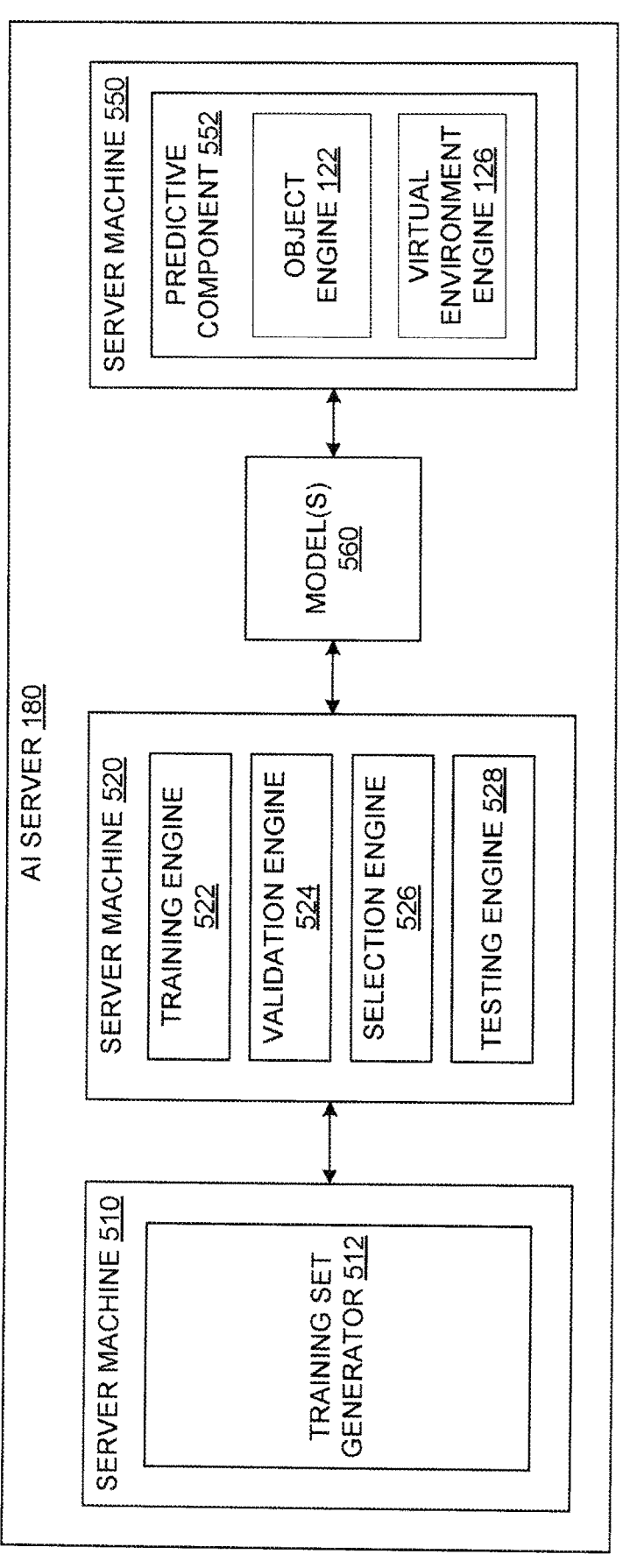
FIG. 5 is a block diagram that includes an example artificial intelligence server, according to at least one embodiment.

FIG. 5 is a block diagram that includes an example AI server 180, according to aspects of the present disclosure. In some embodiments, AI server 180 can be configured to train one or more machine learning models 560 associated with teleportation engine 162. For example, AI server 180 can be configured to train object engine 122, virtual environment engine 126, and/or AI component 275 of FIGS. 1-2.

As illustrated in FIG. 5, AI server 180 can include a training set generator 512 (e.g., residing at server machine 510), a training engine 522, a validation engine 524, a selection engine 526, and/or a testing engine 528 (e.g., each residing at server machines 520), and/or a predictive component 552 (e.g., residing at server machine 550). Training set generator 512 may be capable of generating training data (e.g., a set of training inputs and a set of target outputs) to train model 560. Machine learning models 560 can include one or more large language models (LLMs), as described above, or any other type of machine learning model that is trained to perform tasks pertaining to the above described embodiments.

Training set generator 512 can generate training data for training model 560. Training set generator 512 can obtain training date for training model 560 and can organize or otherwise group the training data for training model 560 (e.g., according to the purpose of the model). In some embodiments, training set generator 512 can initialize a training set T (e.g., for training a respective model 560) to null (e.g., { }). In an illustrative example, training set generator 512 can generate training data for training an ML model used by object engine 122 by obtaining image data and/or a model file associated with one or more to virtual representations of objects, and obtaining one or more characteristics pertaining the virtual representations of the objects. In an illustrative example, training set generator 512 can generate training data for training an ML model used by virtual environment engine 126 by obtaining image data and/or a model file associated with one or more to virtual representations of real-world environments, and obtaining one or more characteristics pertaining the virtual representations of the real-world environments. In an illustrative example, training set generator 512 can generate training data for training an ML model used by model engine 144 by obtaining image data and/or a model file associated with one or more to virtual representations of users, and obtaining one or more characteristics pertaining the virtual representations of the users.

The data indicating one or more characteristics pertaining to the virtual representations can be provided by a developer or operator associated with application 121 (or another application), a creator of the virtual representation(s), and/or a user of application 121 (or another application). Training set generator 512 can generate an input/output mapping. The input can be based on the image data and/or the model file associated with the virtual representation(s), and the output can include characteristic data indicating the one or more characteristics pertaining the virtual representation(s). Training set generator 512 can add the input/output mapping to the training set T and can determine whether the set T is sufficient for training model 560. Training set T can be sufficient for training model 560 if training set T includes a threshold number of input/output mappings, in some embodiments. In response to determining that the training set T is not sufficient for training, training set generator 512 can identify additional data for virtual representations provided by users of platform 120 and/or platform 140 and can generate additional input/output mappings based on the additional data. In response to determining that training set T is sufficient for training, training set generator 512 can provide training set T to train model 560. In some embodiments, training set generator 512 provides training set T to training engine 522.

In an illustrative example, a description of a virtual representation of an object can indicate that the virtual representation represents "a couch that is in a living room and is made out of brown leather." Characteristic data for the virtual representation of the object can include "couch," "leather," "brown," and "location: indoors," in some embodiments. In some embodiments, training set generator 512 can generate characteristic data by extracting key words from the description provided for a virtual representation of the object (e.g., according to semantic and syntactical rules provided by a developer/operator/user of application 121).

In some embodiments, training set generator 512 can generate training date to train a generative AI model, such as AI component 275. Training set generator 512 can initialize a training set T to null to null (e.g., { }). Training set generator 512 can obtain data associated with one or more user-provided queries to platforms 120, 140 and/or one or more responses to queries. The responses to queries can include model files or images generated in response to user-provided queries, in some embodiments. Training set generator 512 can generate an input/output mapping. The input can be based on a user-provided query of training data, and the output can indicate the response to the user-provided query. Training set generator 512 can add the input/output mapping to the training set T and can determine whether training set T is sufficient for training model 560. Training set T can be sufficient for training model 560 if training set T includes a threshold amount of input/output mappings, in some embodiments. In response to determining that training set T is not sufficient for training, training set generator 512 can identify additional data that indicates additional phrases provided by users of platform 120, 140 and can generate additional input/output mappings based on the additional data. In response to determining that training set T is sufficient for training, training set generator 512 can provide training set T to train model 560. In some embodiments, training set generator 512 provides the training set T to training engine 522. In additional or alternative embodiments, AI component 275 can be trained according to embodiments described with respect to FIG. 6.

Training engine 522 can train a machine learning model 560 using the training data (e.g., training set T) from training set generator 512. The machine learning model 560 can refer to the model artifact that is created by the training engine 522 using the training data that includes training inputs and/or corresponding target output (correct answers for respective training inputs). The training engine 522 can find patterns in the training data that map the training input to the target output (the answer to be predicted), and provide the machine learning model 560 that captures these patterns. The machine learning model 560 can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model may be trained by, for example, adjusting weights of a neural network in accordance with a backpropagation learning algorithm or the like. In one aspect, the training set is obtained by training set generator 512 hosted by server machine 510.

Validation engine 524 may be capable of validating a trained machine learning model 560 using a corresponding set of features of a validation set from training set generator 512. The validation engine 524 may determine an accuracy of each of the trained machine learning models 560 based on the corresponding sets of features of the validation set. The validation engine 524 may discard a trained machine learning model 560 that has an accuracy that does not meet a threshold accuracy. In some embodiments, the selection engine 526 may be capable of selecting a trained machine learning model 560 that has an accuracy that meets a threshold accuracy. In some embodiments, the selection engine 526 may be capable of selecting the trained machine learning model 560 that has the highest accuracy of the trained machine learning models 560.

The testing engine 528 may be capable of testing a trained machine learning model 560 using a corresponding set of features of a testing set from training set generator 512. For example, a first trained machine learning model 560 that was trained using a first set of features of the training set may be tested using the first set of features of the testing set. The testing engine 528 may determine a trained machine learning model 560 that has the highest accuracy of all of the trained machine learning models based on the testing sets.

As described above, AI server 180 can be configured to train a large language model. It should be noted that AI server 180 can train the large language model in accordance with embodiments described herein and/or in accordance with other techniques for training a large language model. For example, large language model may be trained on a large amount of data, including prediction of one or more missing words in a sentence, identification of whether two consecutive sentences are logically related to each other, generation of next texts based on prompts, etc.

Predictive component 552 of server machine 550 may be configured to feed data as input to model 560 and obtain one or more outputs. As illustrated in FIG. 5, predictive component 552 can include object engine 122 and/or virtual environment engine 126. Object engine 122 can feed object/environment data 252 as input to model 560 and can obtain one or more outputs, which can indicate one or more virtual representations of an object. Virtual environment engine 126 can feed environment data 204 as input to model 560 and can obtain one or more outputs, which can include a model file (or a portion of a model file) representing a virtual representation of the real-world environment. In some embodiments, model 560 can output a similarity score, which the object engine 122 and/or the virtual environment engine 126 can use to determine whether to update the output or to generator a new virtual representation of the object/real-world environment.

Figure 6:
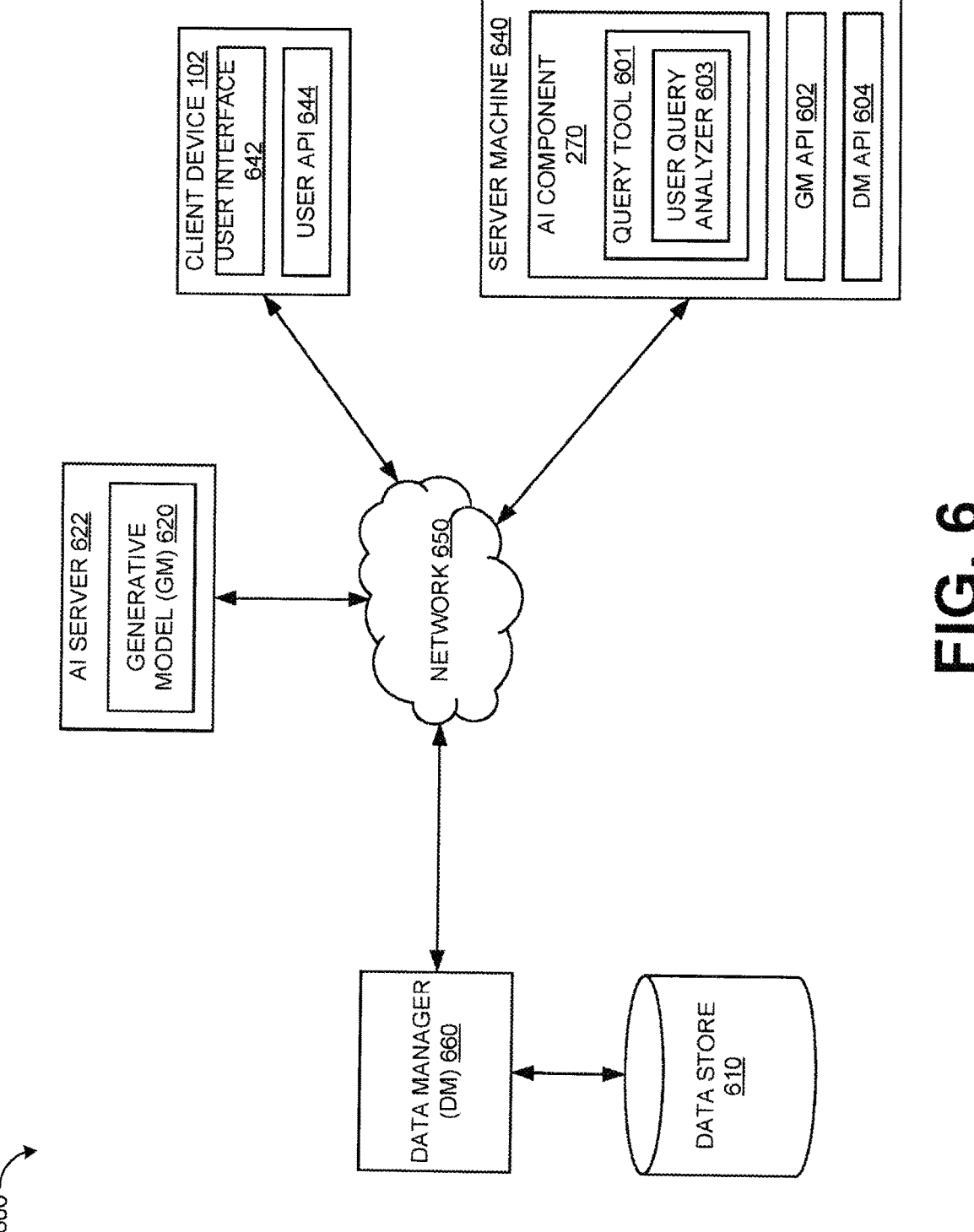
FIG. 6 depicts an illustrative generative artificial intelligence system, according to at least one embodiment.

FIG. 6 illustrates a high-level component diagram of an example generative artificial intelligence system architecture 600, in accordance with one or more aspects of the disclosure. The system architecture 600 (also referred to as "system" herein) includes a data store 610, a generative model 620 provided by AI server 622, a server machine 640 with a query tool (QT) 601, one or more client devices 102, and/or other components connected to a network 650. In some embodiments, generative model 620 can correspond to AI component 275 of FIG. 2. In some embodiments, system 600 can be a part of or can be included in AI server 180. In additional or alternative embodiments, client device(s) 102 can correspond to or can include client devices 102A-N of FIG. 1. Network 650 can correspond to network 104 of FIG. 1 and/or can correspond to another network, as described herein.

The system architecture 600 includes an AI server 622 including a generative mode (GM) 620 (also referred to herein as a generative AI model). GM 620 can be or can otherwise correspond to AI component 275, object engine 122, and/or virtual environment engine 126, described with respect to FIGS. 1-2. A generative AI model can include an AI model that is trained to generate new, original data based on given inputs. GM 620 can be trained based on a corpus of data, as described herein.

A generative AI model can deviate from a machine learning model based on the generative AI model's ability to generate new, original data, rather than making predictions based on existing data patterns. A generative AI model can include a generative adversarial network (GAN) and/or a variational autoencoder (VAE). In some instances, a GAN, a VAE, and/or other types of generative AI models can employ a different approach to training and/or learning the underlying probability distribution of training data, compared to some machine learning models. For instance, a GAN can include a generator network and a discriminator network. The generator network attempts to product synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

GM 620 can be trained to determine the context of a given input text through its ability to analyze and understand surrounding words, phrases, and patterns within given input text. In some embodiments, the text can be generated by converting speech to text. That is, a user can pose a question orally, the speech can be converted to text, and that text can be provided as input. The training generator can identify or otherwise obtain sentences (or parts of sentences) of phrases provided by users of platform 120, 140, in some embodiments. In some embodiments, the phrases (e.g., audio phrases, textual phrases, etc.) can be provided based on a user interaction with application instance 202 via client device 102. The phrases can be included in content produced or retrieved from other sources of the Internet and/or any other database accessible by the training set generator and/or GM 620. The training set generator can generate an input/output mapping based on the obtained sentences (or parts of sentences). The input can include a portion of an obtained sentence of a phrase. Another portion of the obtained sentence or phrase is not included in the input. The output can include the complete sentence (or part of the sentence), which includes both the portion included in the input and the additional portion that is not included in the input. In accordance with embodiments of the present disclosure, the training set generated by the training set generator to train GM 620 can include a significantly large amount of input/output mappings (e.g., millions, billions, etc.). In some embodiments, multiple input/output mappings of the training set can correspond to the same sentence (or part of the sentence), where the input of each of the input/output mappings include a different portion of the sentence (or part of the sentence).

In some embodiments, the sentences used to generate the input/output mapping of the training set can be obtained from phrases included in electronic documents (e.g., collaborative electronic documents, web page documents, etc.). In such embodiments, the training set generator can determine a context of one or more portions of content of an electronic document. For example, the training set generator can provide a portion of content as input to another machine learning model that is trained to predict a context of the content. the training set generator can update an input/output mapping corresponding to the sentence included in the electronic document to include the determined context. In other or similar embodiments, the training set generator can update the input/output mapping for the sentence to include an indicator of the electronic document (e.g., a pointer or link to the document, a memory address or a web address for the electronic document).

It should be note that AI server 622 can train the GM 620 in accordance with embodiments described herein and/or in accordance with other techniques for training a large language model. For example, GM 620 may be trained on a large amount of data, including prediction of one or more missing words in a sentence, identification of whether two consecutive sentences are logically related to each other, generation of next texts based on prompts, etc.

In some embodiments, data store 610 (database, data warehouse, etc.) may store any suitable raw and/or processed data. System 600 can include a data manger (DM) 660 that can be any application configured to manage data transport to and from data store 610, e.g., retrieval of data and/or storage of new data, indexing data, arranging data by user, time type of activity to which the data is related, associating the data with keywords, and/or the like. DM 660 can collect data associated with various user activities, e.g., data pertaining to a user interaction with UI elements of client device 102, sensors 103A-M, other applications internal tools, and/or the like. DM 660 can collect, transform, aggregate, and/or archive such data in data store 610. In some embodiments, DM 660 can support a suitable software that, with user's consent, resides on client device(s) 102 and/or track user activities. For example, the DM-supported software can capture user-generated content and convert the captured content into a format that can be used by various content destinations. In some embodiments, the DM-supported software can be a code snipped integrated into user's browsers/app, and/or websites visited by the user. Generating, tracking, and/or transmitting data can be facilitated by one or more library of DM 660. In some embodiments, data can be transmitted using messages in the JSON format. A message can include a user digital identifier, a timestamp, a name and version of a library that generated the message, page path, user agent, operating system, and/or settings. A message can further include various user traits, which should be broadly understood as any contextual data associated with user's activities, location, and/or preferences.

DM 660 can validate data, convert data into a target format, identify and eliminate duplicate data, and/or the like. DM 660 can scan multiple user's profiles to identify and group users that are related to the same organization, activity, interests, and/or the like. DM 660 can scan numerous user's actions and identify user's profiles associated with multiple uses of a particular resource (e.g., a virtual meeting). DM 660 can ensure reliable delivery of data from user profiles (user personas) to recipients of that data, e.g., by tracking and re-delivering (re-routing) data whose transmissions failed.

Data store 610 can be implemented in a persistent storage capable of storing files as well as data structures to perform identification of data, in accordance with embodiments of the disclosure. data store 610 can be hosted by one or more storage devices, such as main memory, magnetic or optical storage disks, tapes, or hard drives, network-attached storage (NAS), storage area network (SAN), and so forth. Although depicted as separate from the server machine 640, data store 610 can be part of server machine 640, and/or other devices. In some embodiments, data store 610 can be implemented on a network-attached file server, while in other embodiments, data store 610 can be implemented on some other type of persistent storage, such as an object-oriented database, a relational database, and so forth, that may be hosted by a server machine 640 or one or more different machines coupled to server machines 640 via network 605.

Server machine 640 can include QT 601 configured to perform automated identification and facilitate retrieval of relevant and timely contextual information for quick and accurate processing of user queries by generative model 620. In some embodiments, QT 601 may be implemented by AI component 275. It can be noted that a user's request for an operation pertaining to a virtual representations can be formed into a query that uses QT 601 in some embodiments. Via network 650, QT 601 can be in communication with one or more client devices 102, AI server 622, and data store 610, e.g., via DM 660. Communications between QT 601 and AI server 622 can be facilitated by GM API 602. Communications between QT 601 and data store 610/DM660 can be facilitated by DM API 604. Additionally, GM API 602 can translate various queries generated by QT 601 into unstructured natural-language format and, conversely, translate responses received from generative model 620 into any suitable form (including any structured proprietary format as may be used by QT 601). Similarly, DM API 604 can support instructions that may be used to communicate data requests to DM 660 and formats of data received from data store 610 via DM 660.

A user can interact with QT 601 via a UI 642 of client device 102. UI 642 can support any suitable types of user inputs, e.g., content from one or more UI elements, speech inputs (captured by a microphone), text input (entering using a keyboard, touchscreen, or any pointing data), camera (e.g., for recognition of sign language), and/or the like, or any combination thereof. UI 642 can further support any suitable types of outputs, e.g., speech outputs (via one or more speakers), text, graphics, and/or sign language outputs (e.g., displayed via any suitable screen), file for a word editing application, and/or the like, or any combination thereof. In some embodiments, UI 642 may be a web-based UI (e.g., a web browser-supported interface), a mobile application-supported UI, or any combination thereof. UI 642 can include selectable items. In some embodiments, UI 642 can allow a user to select from multiple (e.g., specialized in particular knowledge areas) generative models 620. UI 642 can allow the user to provide consent for QT 601 and/or generative model 620 to access user data previously stored in data store 610 (and/or any other memory device), process and/or store new data received from the user, and the like. UI 642 can allow the user to withhold consent to provide access to user data to QT 601 and/or generative model 620. In some embodiments, user inputs entered via UI 642 can be communicated to QT 601 via a user API 644. In some embodiments, UI 642 and user API 644 can be located on client device 102 that the user is using to QT 601. For example, an API package with user API 644 and/or user interface 642 can be downloaded to client device 102. The downloaded API package can be used to install user API 644 and/or UI 642 to enable the user to have two-communication with QT 601.

QT 601 can include a user query analyzer 603 to support various operations of this disclosure. For example, user query analyzer 603 can receive a user input, e.g., user query, and generate one or more intermediate queries to generative model 620 to determine what type of user data GM 620 might need to successfully respond to user input. Upon receiving a response from GM 620, user query analyzer 603 can analyze the response, from a request for relevant contextual data for DM 660, which can then supply such data. User query analyzer 603 may then generate a final query to GM 620 that includes the original user query and the contextual data received from DM 660. In some embodiments, user query analyzer 603 may itself include a lightweight generative model that may process the intermediate query(ies) and determine what type of contextual data may have to be provided to GM 620 together with the original user query to ensure a meaningful response from GM 620.

QT 601 can include (or can have access to) instructions stored on one or more tangible, machine-readable storage media server machines 630 and executable by one or more processing devices of server machines 630. In one embodiment, QT 601 can be implemented on a single machine (e.g., as depicted in FIG. 6). In some embodiments, QT 601 can be a combination of a client component and a server component. In some embodiments, QT 601 can be executed entirely on the client device(s) 102. Alternatively, some portion of QT 601 can be executed on a client computing device while another portion of QT 601 can be executed on server machine 630.

Inference and Training Logic

Figure 7A:
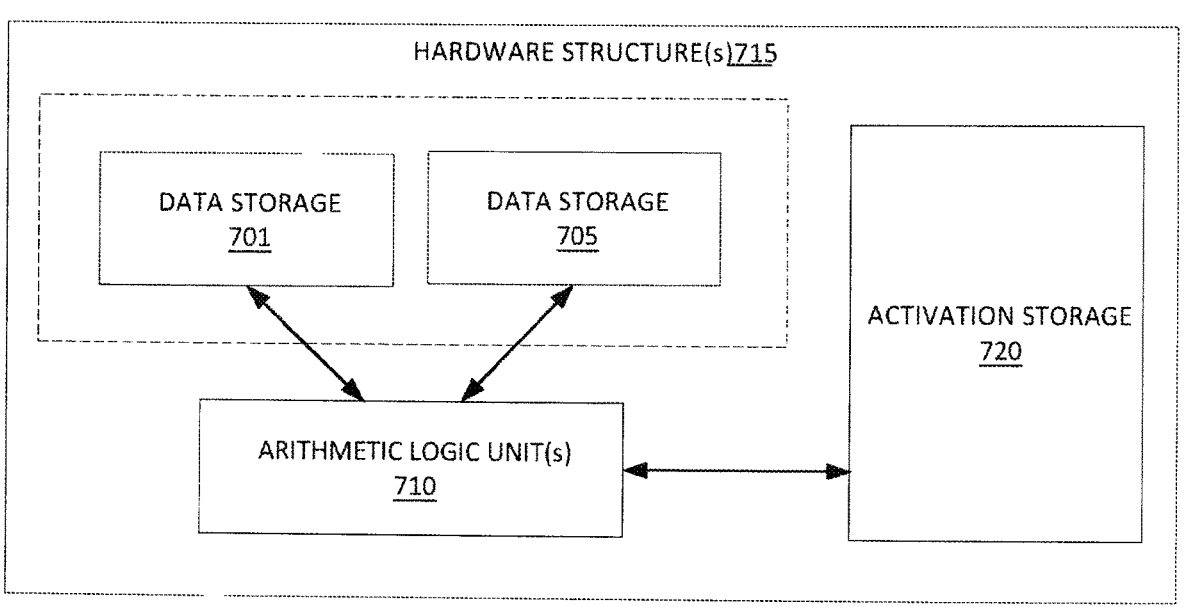
FIG. 7A illustrates inference and/or training logic, according to at least one embodiment.

FIG. 7A illustrates hardware structure(s) 715 for inference and/or training logic used to perform inferencing and/or training operations associated with one or more embodiments. Details regarding inference and/or training logic are provided below in conjunction with FIGS. 7A and/or 7B.

In at least one embodiment, hardware structure(s) 715 for inference and/or training logic may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, hardware structure(s) 715 for inference and/or training logic may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic may include, or be coupled to code and/or data storage 705 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, hardware structure(s) 715 for inference and/or training logic may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic described with respect to in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic may be used in conjunction with central processing unit ("CPU") hardware, graphics processing unit ("GPU") hardware or other hardware, such as field programmable gate arrays ("FPGAs").

Figure 7B:
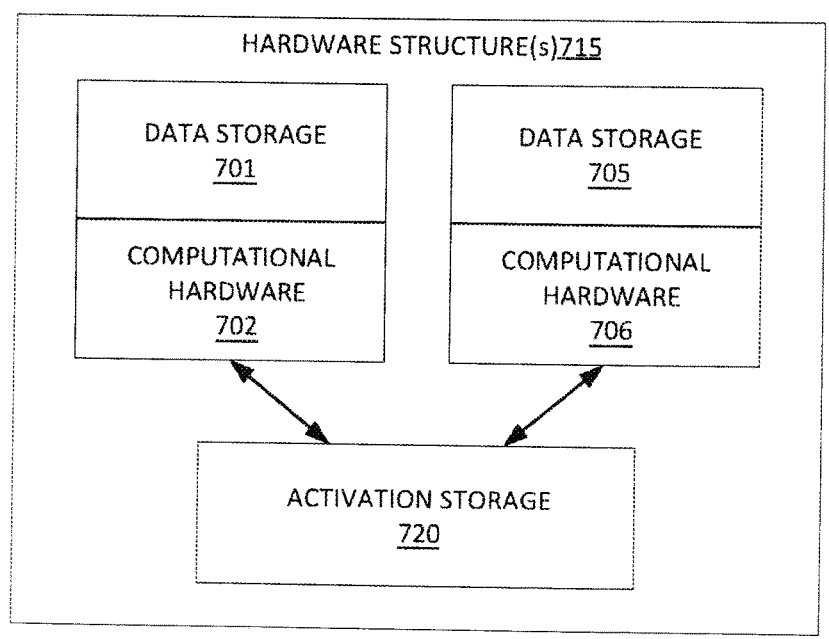
FIG. 7B illustrates inference and/or training logic, according to at least one embodiment.

FIG. 7B illustrates hardware structure(s) 715 for inference and/or training logic, according to at least one or more embodiments. In at least one embodiment, hardware structure(s) 715 may include, without limitation, hardware logic in which computational resources are dedicated or otherwise exclusively used in conjunction with weight values or other information corresponding to one or more layers of neurons within a neural network. In at least one embodiment, inference and/or training logic may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic may be used in conjunction with central processing unit (CPU) hardware, graphics processing unit (GPU) hardware or other hardware, such as field programmable gate arrays (FPGAs). In at least one embodiment, hardware structure(s) 715 for inference and/or training logic includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic.

Data Center

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic of hardware structure(s) 715 are used to perform inferencing and/or training operations associated with one or more embodiments. Details regarding inference and/or training logic of hardware structure(s) 715 are provided herein in conjunction with FIGS. 8A and/or 8B. In at least one embodiment, inference and/or training logic of hardware structure(s) 715 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Computer Systems

Figure 9:
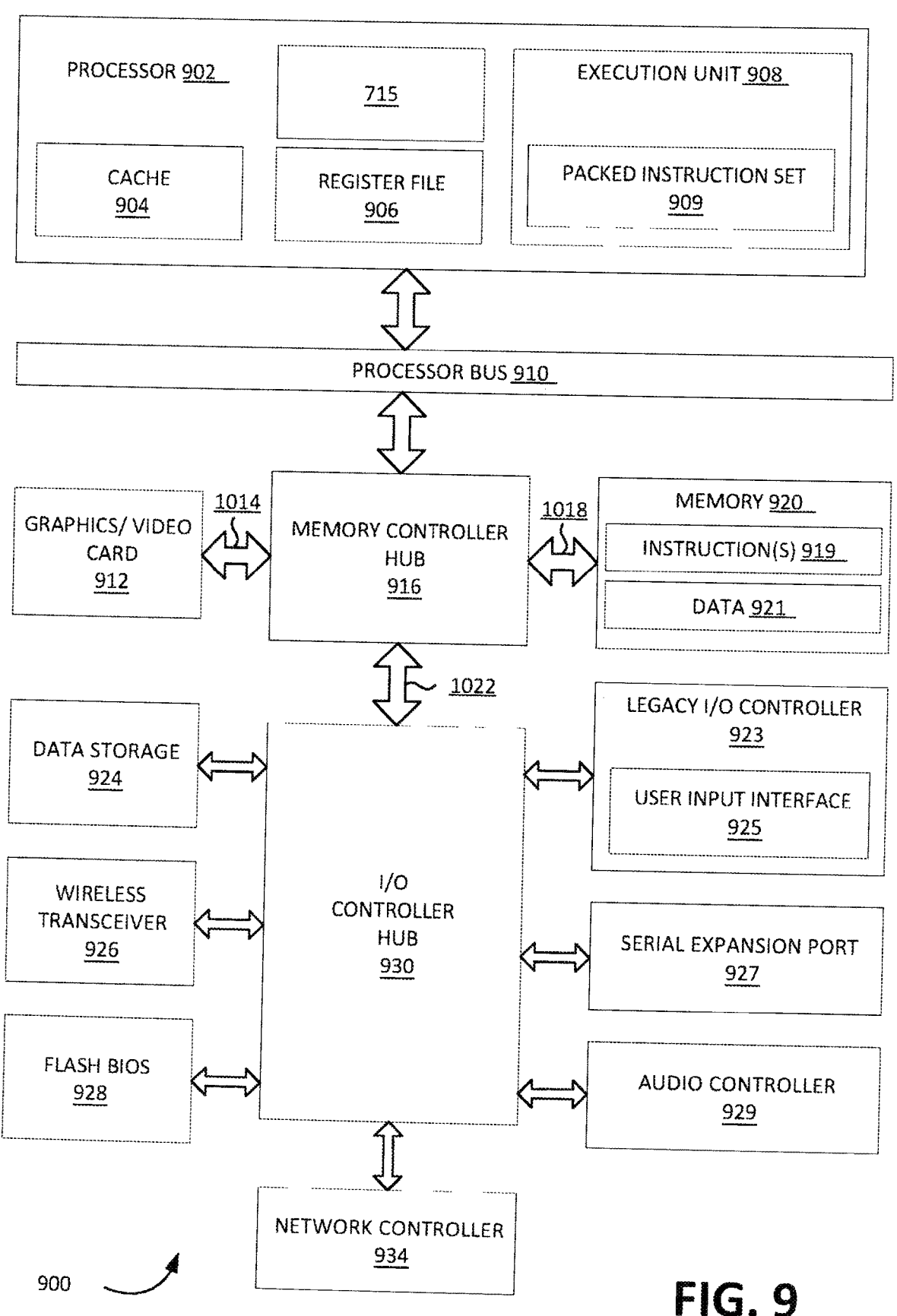
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934, which may include in some embodiments, a data processing unit. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic of hardware structure(s) 715 are used to perform inferencing and/or training operations associated with one or more embodiments. Details regarding inference and/or training logic of hardware structure(s) 715 are provided herein in conjunction with FIGS. 8A and/or 8B. In at least one embodiment, inference and/or training logic of hardware structure(s) 715 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 10:
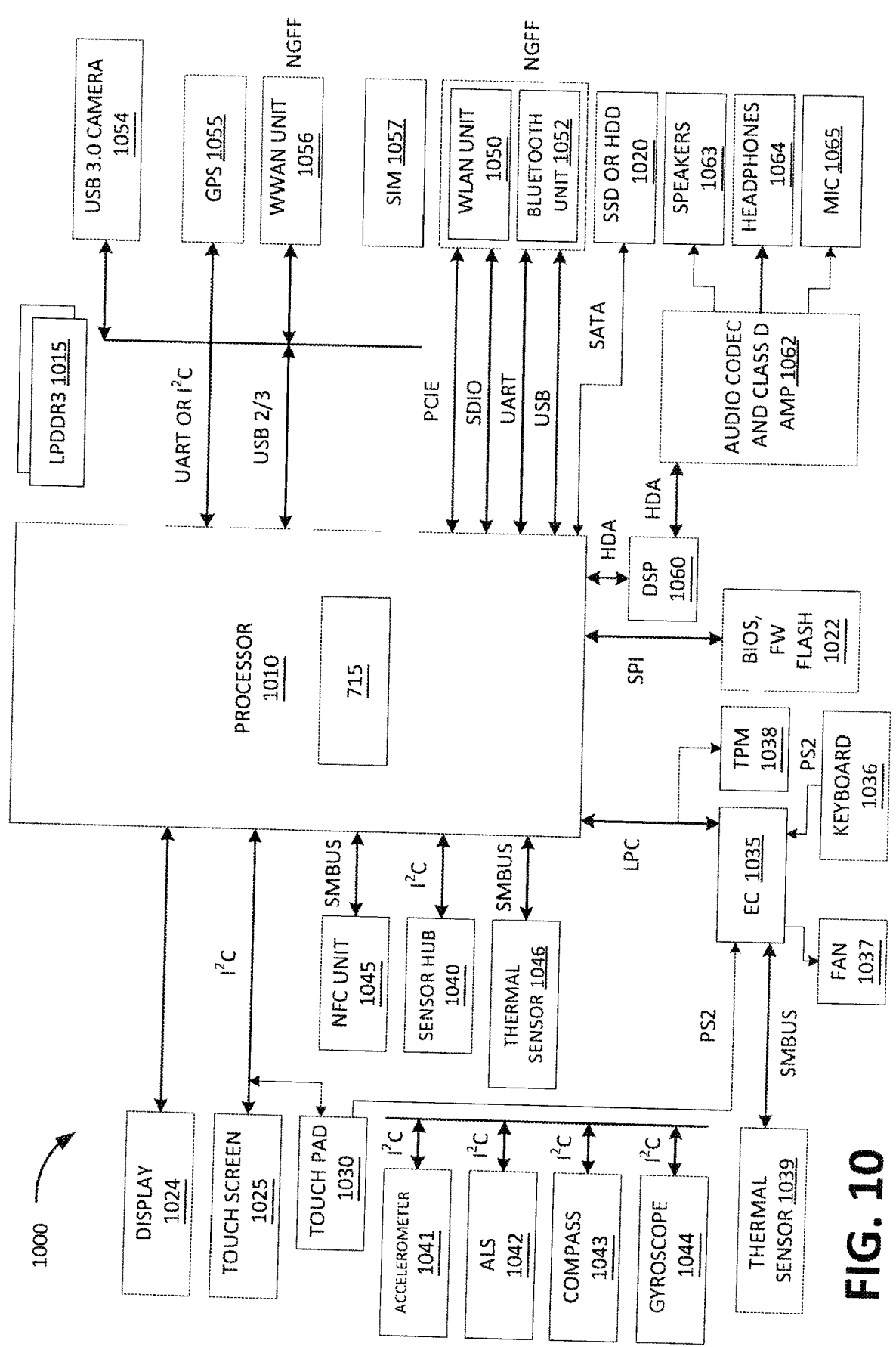
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic of hardware structure(s) 715 are used to perform inferencing and/or training operations associated with one or more embodiments. Details regarding inference and/or training logic of hardware structure(s) 715 are provided herein in conjunction with FIGS. 8A and/or 8B. In at least one embodiment, inference and/or training logic of hardware structure(s) 715 may be used in system FIG. 10 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 11:
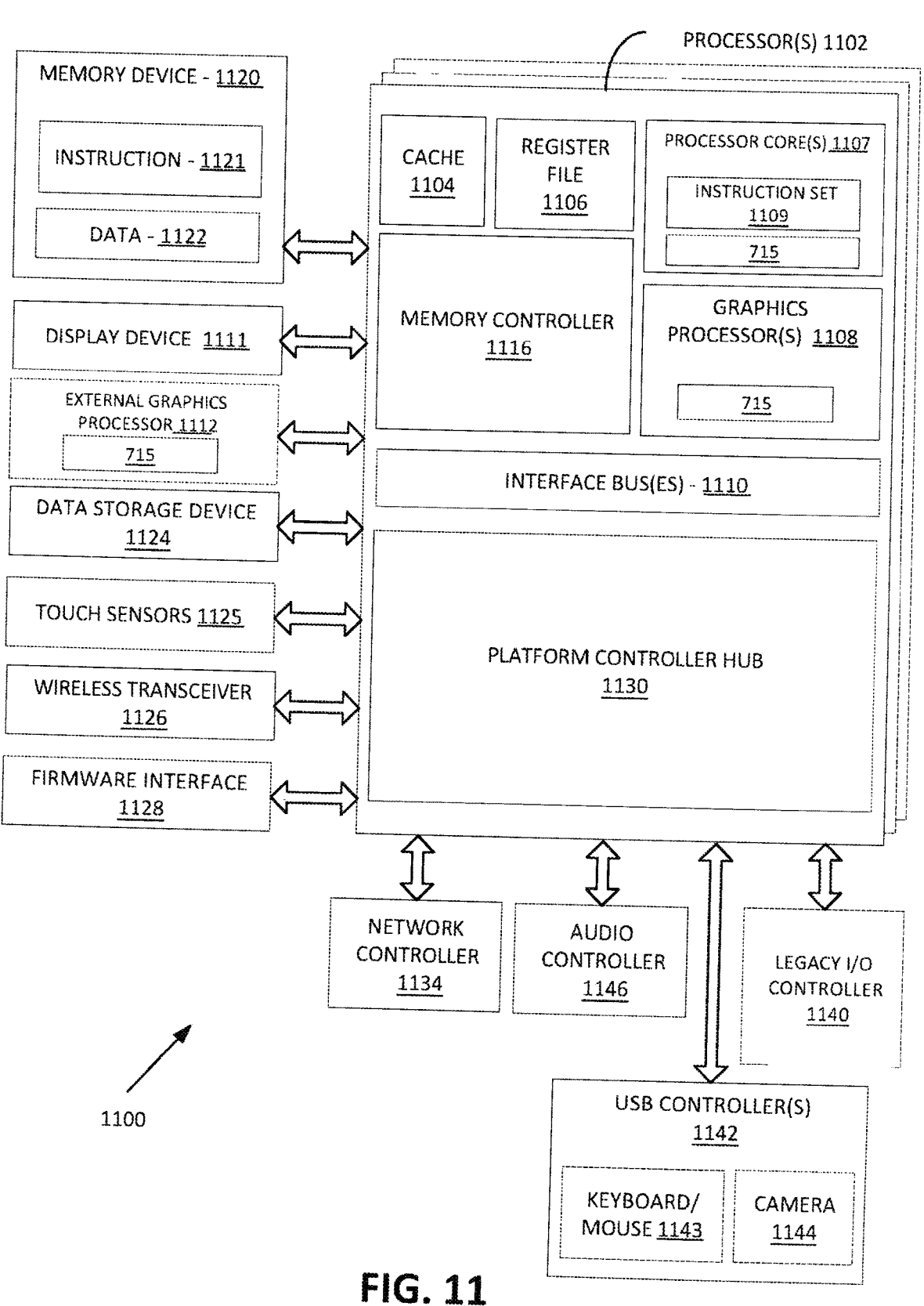
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, edge, or embedded devices.

In at least one embodiment, system 1100 may include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 may also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 may have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, may be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 may be a dynamic random access memory (DRAM) device, a static random access memory (SRAM) device, flash memory device, phase-change memory device, or some other memory device having suitable performance to serve as process memory. In at least one embodiment memory device 1120 may operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 may connect to processor(s) 1102. In at least one embodiment display device 1111 may include one or more of an internal display device, as in a mobile electronic device or a laptop device or an external display device attached via a display interface (e.g., DisplayPort, etc.). In at least one embodiment, display device 1111 may include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 may connect via a storage interface (e.g., SATA) or via a peripheral bus, such as a Peripheral Component Interconnect bus (e.g., PCI, PCI Express). In at least one embodiment, touch sensors 1125 may include touch screen sensors, pressure sensors, or fingerprint sensors. In at least one embodiment, wireless transceiver 1126 may be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and may be, for example, a unified extensible firmware interface (UEFI). In at least one embodiment, network controller 1134 may enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 may also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 may include an external memory controller 1116 and platform controller hub 1130, which may be configured as a memory controller hub and peripheral controller hub within a system chipset that is in communication with processor(s) 1102.

Inference and/or training logic of hardware structure(s) 715 are used to perform inferencing and/or training operations associated with one or more embodiments. Details regarding inference and/or training logic of hardware structure(s) 715 are provided herein in conjunction with FIGS. 8A and/or 8B. In at least one embodiment portions or all of inference and/or training logic of hardware structure(s) 715 may be incorporated into graphics processor 1108. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 8A or 8B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 12:
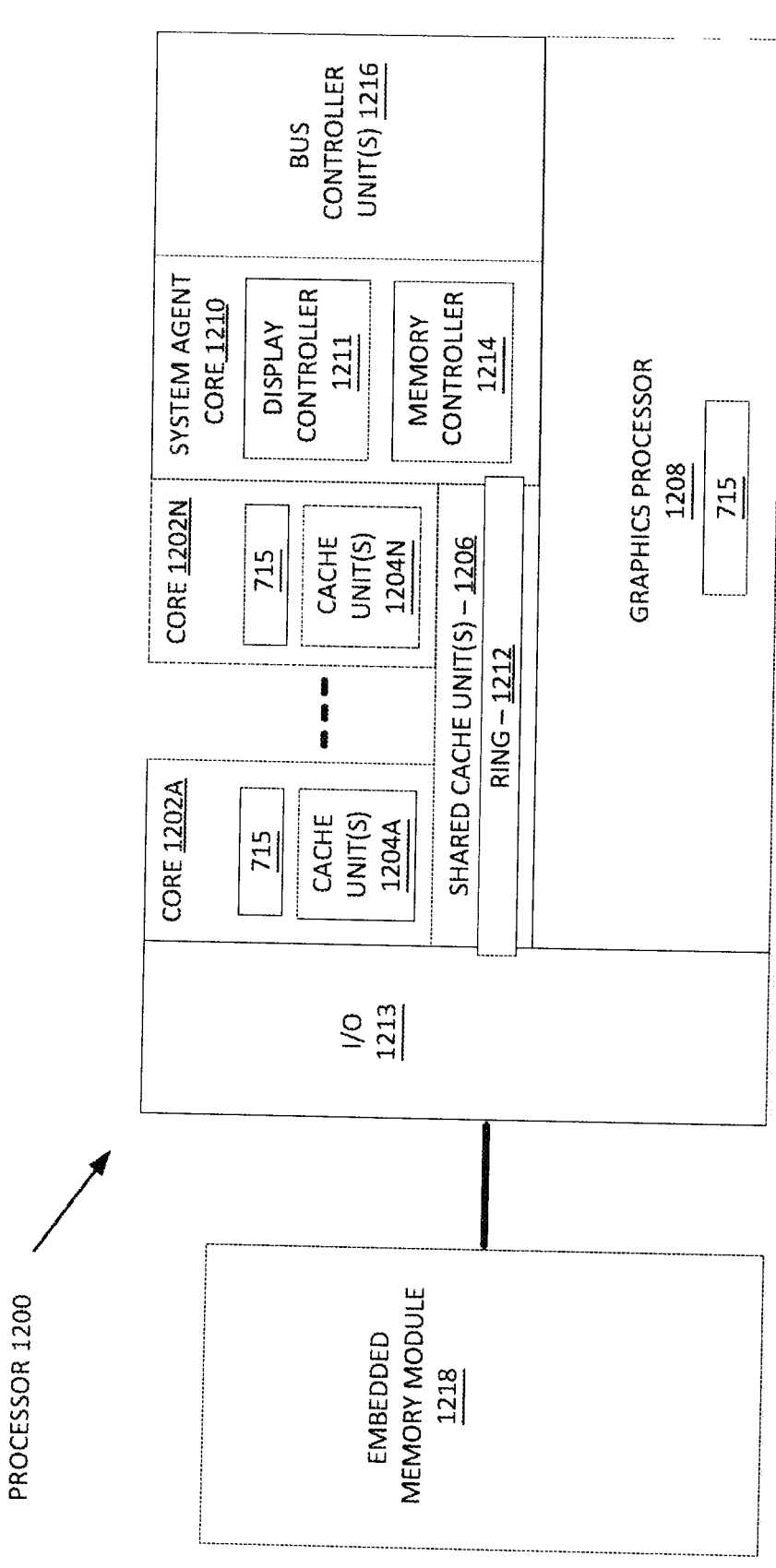
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 may include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 may be implemented on one or more chips or as an SoC integrated circuit.

Inference and/or training logic of hardware structure(s) 715 are used to perform inferencing and/or training operations associated with one or more embodiments. Details regarding inference and/or training logic of hardware structure(s) 715 are provided herein in conjunction with FIGS. 7A and/or 7B. In at least one embodiment portions or all of inference and/or training logic of hardware structure(s) 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Virtulized Computing Platform

Figure 13:
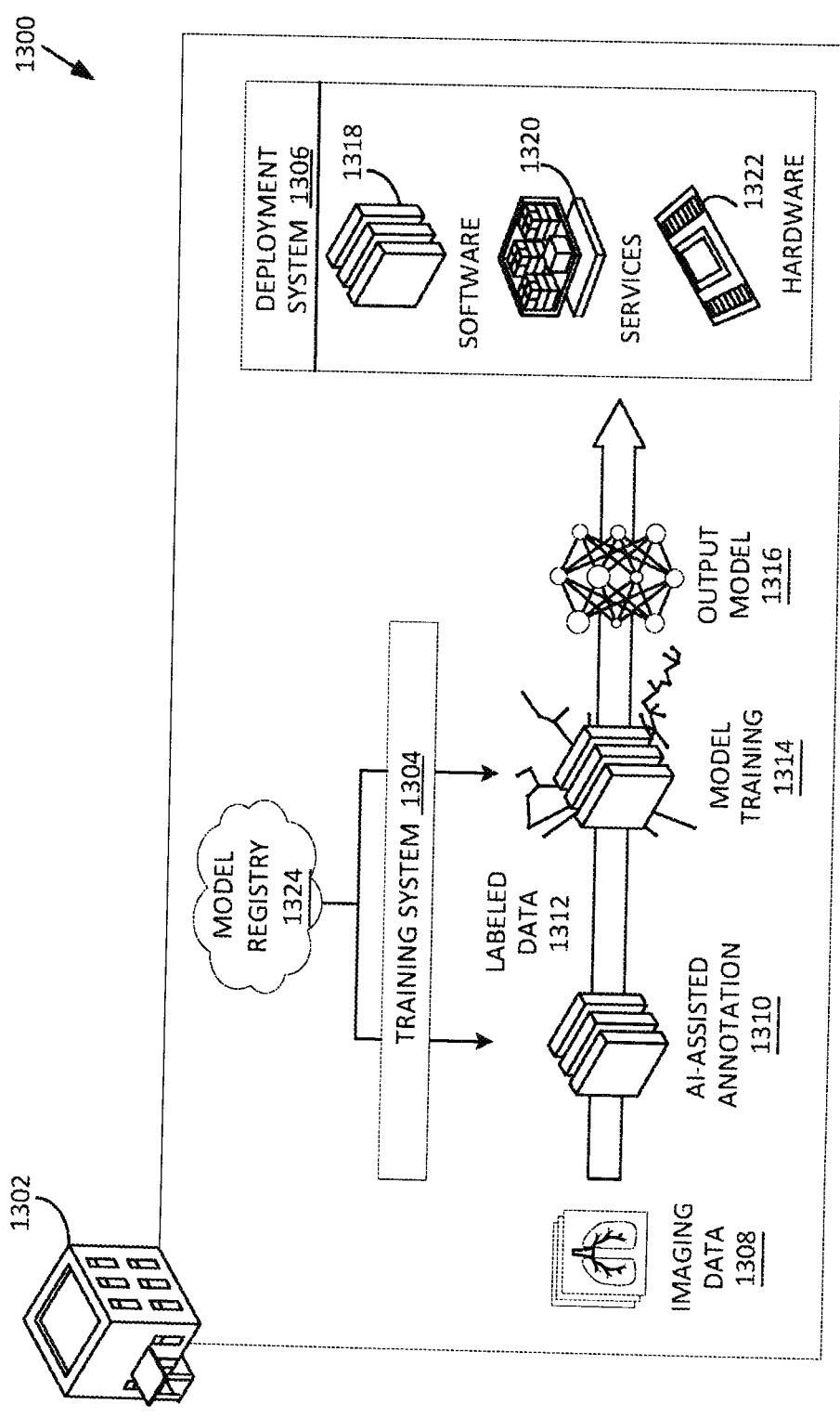
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
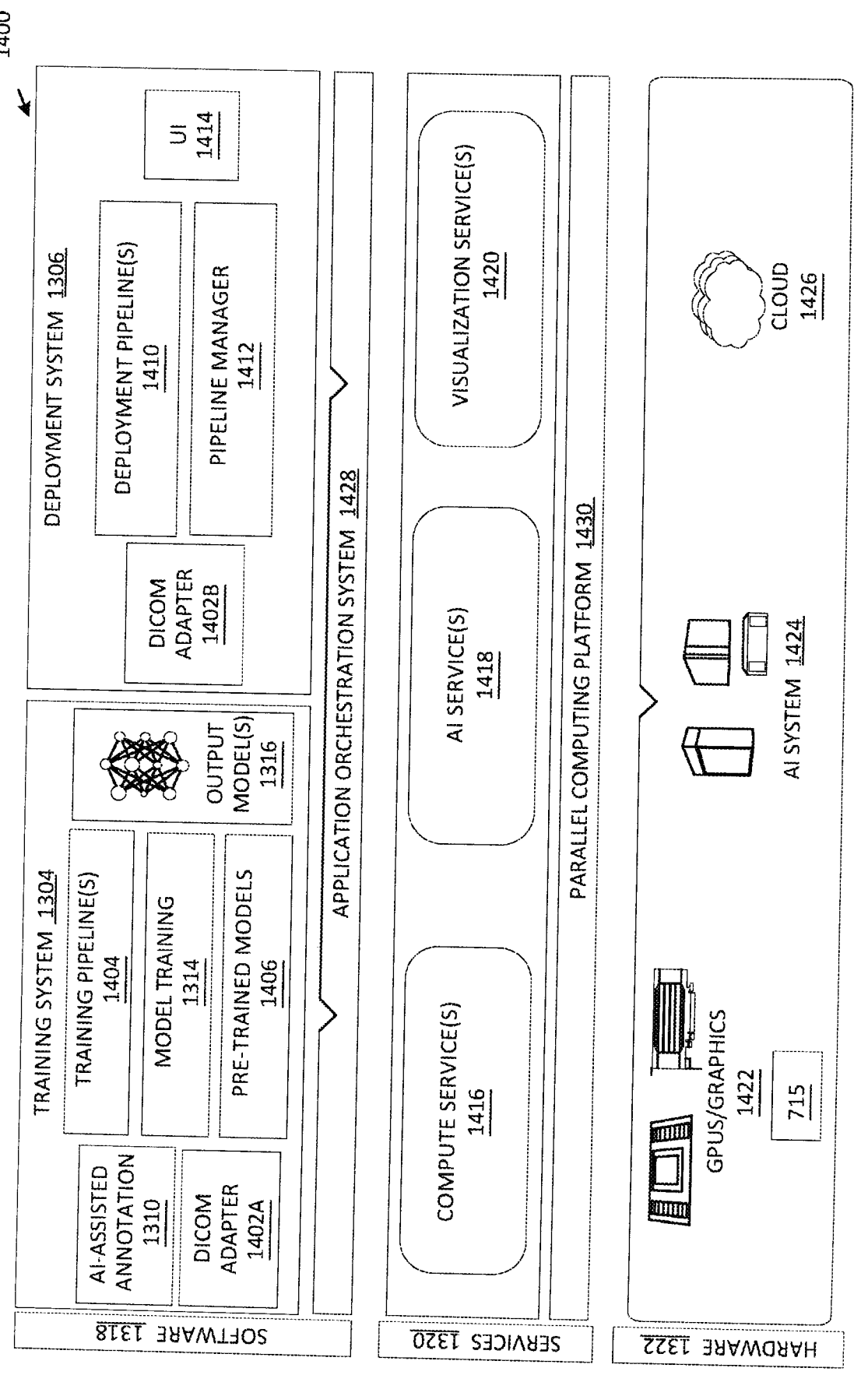
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g., pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption. In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an MRI machine, there may be a first deployment pipeline 1410, and where image enhancement is desired from output of an MRI machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify, or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 11) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline (s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched.

Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<11 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to DPUs, CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
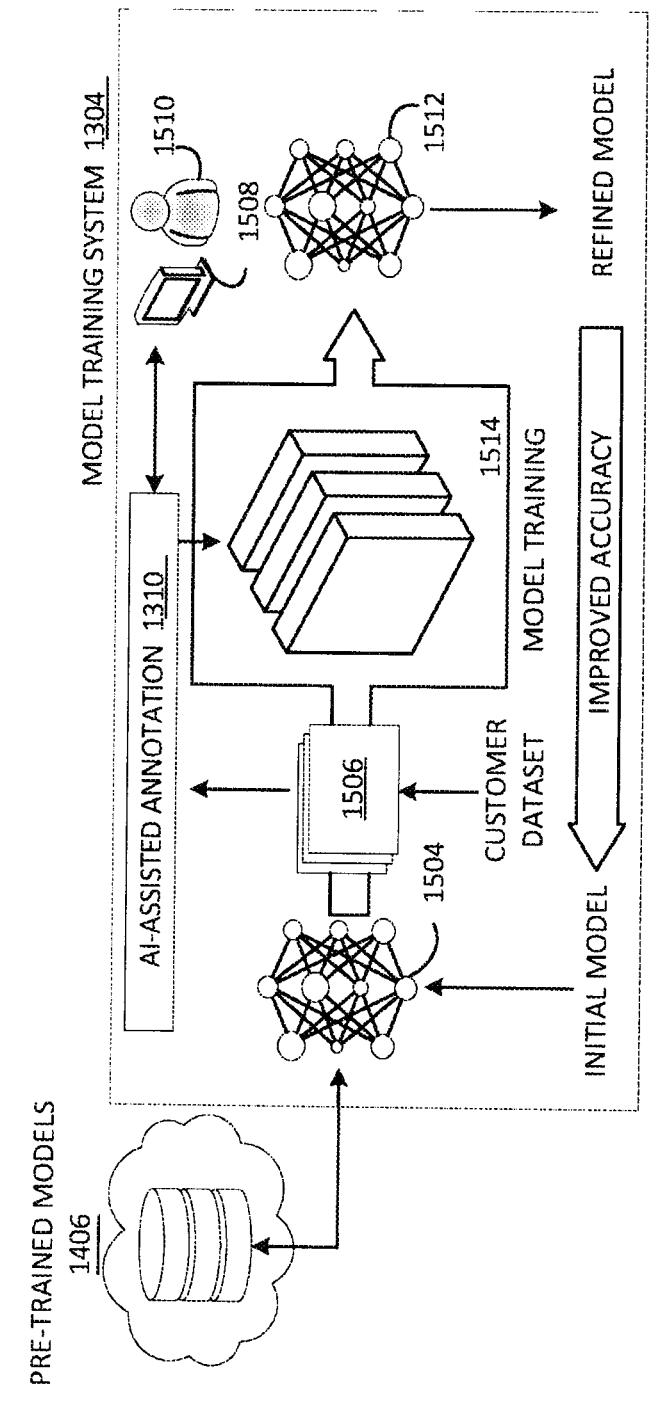

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

receiving, from one or more sensors worn by a first user, a first set of data associated with a real-world environment comprising the first user;

identifying, based on the first set of data, an object in the real-world environment and a first location of the object;

identifying, based on the first set of data, a second location of the first user within the real-world environment;

receiving a second set of data representing a first avatar of a guest user;

generating, based on the first set of data and the second set of data, a virtual representation of the real-world environment comprising the object positioned at the first location and at least one of: a second avatar of the first user positioned at the second location or the first avatar of the guest user positioned at a third location;

sending the virtual representation to a computing system associated with the guest user;

identifying an area of focus of the real-world environment, wherein the area of focus is associated with at least one of the first user or the guest user;

assigning a priority to one or more objects located within the area of focus; and responsive to receiving updated data corresponding to a first object of the one or more objects located within the area of focus, causing the first object to be updated prior to other objects in the real-world environment.

2. The method of claim 1, wherein generating the virtual representation of the real-world environment further comprises:

dynamically updating the virtual representation to coincide with changes in the real-world environment.

3. The method of claim 1, further comprising:

sending, to a another computing system associated with the first user, at least one of: the virtual representation, or an indicator indicating that the virtual representation is being sent to the computing system associated with the guest user.

4. The method of claim 3, wherein at least one of the computing system or the another computing system comprises one of a virtual reality system or an augmented reality system.

5. The method of claim 1, wherein identifying the object in the real-world environment comprises:

identifying a virtual object candidate corresponding to the object in the real-world environment, wherein identifying the virtual object candidate comprises:

generating a vector embedding of the object;

searching an embedding space for one or more virtual object candidates within a threshold distance to the vector embedding in the embedding space; and selecting the virtual object candidate from the one or more virtual object candidates, wherein the object positioned at the first location comprises the virtual object candidate positioned at the first location.

6. The method of claim 5, further comprising:

responsive to determining that the object has moved to a fourth location, identifying an updated virtual object candidate corresponding to the object in the real-world environment, wherein identifying the updated virtual object candidate comprises:

generating a second vector embedding of the object;

searching the embedding space for one or more updated virtual object candidates within a second threshold distance to the second vector embedding in the embedding space; and selecting the updated virtual object candidate from the one or more updated virtual object candidates, wherein the object positioned at the fourth location includes the updated virtual object candidate positioned at the fourth location; and updating the virtual object candidate to the updated virtual object candidate in the virtual representation of the real-world environment.

7. The method of claim 1, further comprising:

receiving a third set of data from one or more devices in the real-world environment;

identifying a fourth set of data associated with the real-world environment; and updating the virtual representation of the real-world environment based on at least one of the third set of data or the fourth set of data.

8. The method of claim 1, wherein the first location of the object comprises at least one of a position, an orientation, a configuration, or a scale of the object, and wherein the first location of the object is based on metadata associated with the first set of data.

9. The method of claim 1, further comprising:

receiving, from the computing system, a third set of data associated with a virtual representation of the object in the virtual representation of the real-world environment; and causing, based on third set of data, the virtual representation of the real-world environment to be updated.

10. The method of claim 9, further comprising:

sending, via an application programming interface, the third set of data associated with the virtual representation of the object, wherein the application programming interface causes an action to be executed with respect to the object in the real-world environment.

11. The method of claim 1, further comprising:

identifying a virtual asset data store comprising a plurality of virtual representations of objects; and identifying, based on at least a subset of the first set of data, in the virtual asset data store, a virtual representation of the object in the real-world environment of the plurality of virtual representation of objects, wherein the virtual representation of the real-world environment comprise the virtual representation of the object.

12. The method of claim 11, wherein the virtual representation of the object satisfies a similarity criterion, and wherein the virtual representation of the real-world environment comprises the virtual representation of the object and an indication of one or more modifications to the virtual representation of the object of the plurality of virtual representations of objects, wherein the one or more modifications correspond to the subset of data.

13. The method of claim 1, further comprising:

providing at least a subset of the first set of data as input to a model that is configured to generate three-dimensional representation data of objects;

receiving, as output from the model, three-dimensional representation data of the object in the real-world environment; and generating, based on the output of the model, a virtual representation of the object, wherein the virtual representation of the real-world environment comprise the virtual representation of the object.

14. The method of claim 1, further comprising:

providing the first set of data as input to a model that is configured to generate three-dimensional representation data of real-world environments;

receiving, as output from the model, three-dimensional representation data of the real-world environment; and generating, based on the output of the model, the virtual representation of the real-world environment, wherein the virtual representation of the real-world environment is three-dimensional.

15. A system comprising:

one or more processing devices to perform operations comprising:

receiving, from one or more sensors, a first set of data associated with a real-world environment;

identifying, based on a subset of the first set of data, an object in the real-world environment and a location of the object;

receiving a second set of data associated with a representation of a guest of the real-world environment;

generating, based on the first set of data and the second set of data, a virtual representation of the real-world environment comprising the object at the location and a representation of the guest;

responsive to a triggering event, sending the virtual representation to a computing system associated with the guest;

identifying an area of focus of the real-world environment, wherein the area of focus is associated with the guest;

assigning a priority to one or more objects located within the area of focus; and responsive to receiving updated data corresponding to a first object of the one or more objects located within the area of focus, causing the first object to be updated prior to other objects in the real-world environment.

16. The system of claim 15, wherein the triggering event comprises notification generated by a first computing system associated with the real-world environment.

17. The system of claim 15, wherein the operations further comprise:

receiving, from the computing system, a third set of data associated with a virtual representation of the object in the virtual representation of the real-world environment; and causing, based on third set of data, the virtual representation of the real-world environment to be updated.

18. The system of claim 17, wherein the operations further comprise:

sending, via an application programming interface, the third set of data associated with the virtual representation of the object, wherein the application programming interface causes an action to be executed with respect to the object in the real-world environment.

19. A processor comprising one or more processing units to:

receive, from one or more sensors worn by on a first user, a first set of data associated with a real-world environment comprising the first user;

identify, based on the first set of data, an object in the real-world environment and a first location of the object;

identify, based on the first set of data, a second location of the first user within the real-world environment;

receive a second set of data representing a first avatar of a guest user;

generate, based on the first set of data and the second set of data, a virtual representation of the real-world environment comprising the object positioned at the first location and at least one of: a second avatar of the first user positioned at the second location or the first avatar of the guest user positioned at a third location;

send the virtual representation to a computing system associated with the guest user;

identify an area of focus of the real-world environment, wherein the area of focus is associated with at least one of the first user or the guest user;

assign a priority to one or more objects located within the area of focus; and responsive to receiving updated data corresponding to a first object of the one or more objects located within the area of focus, cause the first object to be updated prior to other objects in the real-world environment.

\* \* \* \* \*